US008230033B2

(12) United States Patent
Fabre et al.

(10) Patent No.: US 8,230,033 B2
(45) Date of Patent: *Jul. 24, 2012

(54) MESSAGE TRACKING FUNCTIONALITY BASED ON THREAD-RECURRENT DATA

(75) Inventors: Patrice M. Fabre, Redwood City, CA (US); Rosalina T. Kessman, Los Angeles, CA (US); Yang Forjindam, Foster City, CA (US)

(73) Assignee: Netsuite, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/087,291

(22) Filed: Apr. 14, 2011

(65) Prior Publication Data

US 2011/0264750 A1  Oct. 27, 2011

Related U.S. Application Data

(63) Continuation of application No. 10/796,718, filed on Mar. 8, 2004, now Pat. No. 7,953,800.

(51) Int. Cl.
*G06F 15/16* (2006.01)
(52) U.S. Cl. ...................................... 709/206
(58) Field of Classification Search ........... 709/206–207
See application file for complete search history.

(56) References Cited

U.S. PATENT DOCUMENTS

| 5,878,230 | A  | 3/1999  | Weber |
| 6,170,002 | B1 | 1/2001  | Ouchi |
| 6,591,291 | B1 | 7/2003  | Gabber et al. |
| 6,643,684 | B1 | 11/2003 | Malkin |
| 6,701,378 | B1 | 3/2004  | Gilhuly |
| 6,784,901 | B1 | 8/2004  | Harvey et al. |
| 6,785,710 | B2 | 8/2004  | Kikinis |
| 6,865,268 | B1 | 3/2005  | Matthews |
| 7,032,030 | B1 | 4/2006  | Codignotto |

(Continued)

FOREIGN PATENT DOCUMENTS

WO    WO 01/09745 A2    2/2001

OTHER PUBLICATIONS

Resnick, P., Ed., "Internet Message Format," Request for Comments 2822 (RFC 2822), Internet Engineering Task Force, 51pp., (Apr. 2001).

*Primary Examiner* — Jason Recek
(74) *Attorney, Agent, or Firm* — Kilpatrick Townsend & Stockton LLP

(57) ABSTRACT

A method, system, computer program product, and related business methods are described in the context of a web-based business information system having an internal e-mail facility, wherein e-mail communications between a native e-mail system of an end user of the web-based business information system and an external contact are facilitated and automatically tracked by the web-based business information system, the native e-mail system lying outside the web-based business information system but often being preferred by the end user over the internal e-mail facility of the web-based business information system. The described preferred embodiments provide for easy-to-use, reasonably transparent, "no-click" integration of the web-based business information system with the end user's native e-mail system in a manner that is independent of the particular type and choice of native e-mail system.

20 Claims, 19 Drawing Sheets

U.S. PATENT DOCUMENTS

| | | |
|---|---|---|
| 7,054,906 B2 | 5/2006 | Levosky |
| 7,231,427 B1 | 6/2007 | Du |
| 7,412,437 B2 | 8/2008 | Moody et al. |
| 7,685,010 B2 | 3/2010 | Goldberg et al. |
| 7,685,515 B2 | 3/2010 | Braud et al. |
| 2002/0046250 A1 | 4/2002 | Nassiri |
| 2002/0120581 A1 | 8/2002 | Schiavone |
| 2002/0120600 A1 | 8/2002 | Schiavone |
| 2002/0120748 A1 | 8/2002 | Schiavone |
| 2002/0152399 A1 | 10/2002 | Smith |
| 2002/0169797 A1 | 11/2002 | Hegde et al. |
| 2003/0101065 A1 | 5/2003 | Rohall et al. |
| 2003/0144903 A1 | 7/2003 | Brechner et al. |
| 2003/0163537 A1 | 8/2003 | Rohall et al. |
| 2004/0006598 A1 | 1/2004 | Bargagli Damm et al. |
| 2004/0049571 A1 | 3/2004 | Johnson et al. |
| 2004/0083269 A1* | 4/2004 | Cummins .................. 709/206 |
| 2004/0083271 A1 | 4/2004 | Tosey |
| 2004/0122943 A1 | 6/2004 | Error et al. |
| 2004/0133810 A1 | 7/2004 | Brischke |
| 2004/0172537 A1 | 9/2004 | Baus et al. |
| 2004/0186738 A1 | 9/2004 | Reisman |
| 2004/0199541 A1 | 10/2004 | Goldberg et al. |
| 2004/0199543 A1 | 10/2004 | Braud et al. |
| 2005/0004990 A1 | 1/2005 | Durazo et al. |
| 2005/0012965 A1 | 1/2005 | Bloomfield |
| 2005/0050007 A1 | 3/2005 | Sampson |
| 2005/0091320 A1 | 4/2005 | Kirsch et al. |
| 2006/0010214 A1 | 1/2006 | McDowell et al. |
| 2007/0005762 A1 | 1/2007 | Knox et al. |
| 2007/0043817 A1 | 2/2007 | Oliver et al. |

* cited by examiner

Rick Castell

```
Return-Path: <antiques4you_n_me@yahoo.com>
Received: from nmail0.svale.netledger.com ([63.209.28.176])
    by dove (EarthLink Mail Service) with ESMTP id 1aVxHS5kr3NZFmi0
    for <rcastell@rockcastle.com>; Tue, 24 Feb 2004 00:14:20 -0800 (PST)
Received: from backend002.svale.netledger.com (backend002.svale.netledger.com [172.17.43.42])
    by nmail0.svale.netledger.com (8.11.6/8.11.6) with ESMTP id i1O8EKa09292
    for <rcastell@rockcastle.com>; Tue, 24 Feb 2004 00:14:20 -0800
Message-ID: <4726209.1077610460615.JavaMail.root@backend002.svale.netledger.com>
Date: Tue, 24 Feb 2004 00:14:20 -0800 (PST)
From: antiques4you_n_me@yahoo.com
Reply-To: "antiques4you_n_me@yahoo.com"
    <messages.ACCT18844.31.8e598ae234653d0e146e@messages.netsuite.com>
To: rcastell@rockcastle.com
Subject: Re: Thank you for choosing Rock Castle !!
MIME-Version: 1.0
Content-Type: text/plain
Content-Transfer-Encoding: quoted-printable From: antiques4you_n_me@yahoo.com
Sent: Tuesday, February 24, 2004 12:14 AM
To: rcastell@rockcastle.com
Subject: Re: Thank you for choosing Rock Castle !!

Rick,
Thank you for your message.  I would like to choose my
own flooring contractor, is this acceptable to Rock
Castle construction?
-Cathy Customer
```

Rick Castell

⑦

```
Return-Path: <antiques4you_n_me@yahoo.com>
Received: from nmail0.svale.netledger.com ([63.209.28.176])
    by dove (EarthLink Mail Service) with ESMTP id 1aVzcu20s3NZFmi0
    for <rcastell@rockcastle.com>; Tue, 24 Feb 2004 01:50:02 -0800 (PST)
Received: from backend002.svale.netledger.com (backend002.svale.netledger.com [172.17.43.42])
    by nmail0.svale.netledger.com (8.11.6/8.11.6) with ESMTP id i1O9o2a13515
    for <rcastell@rockcastle.com>; Tue, 24 Feb 2004 01:50:02 -0800
Message-ID: <29691953.1077616202285.JavaMail.root@backend002.svale.netledger.com>
Date: Tue, 24 Feb 2004 01:50:02 -0800 (PST)
From: antiques4you_n_me@yahoo.com
Reply-To: "antiques4you_n_me@yahoo.com"
    <messages.ACCT18844.33.148e4cbffb39eddde676@messages.netsuite.com>
To: rcastell@rockcastle.com
Subject: Re: Flooring contractor policy
MIME-Version: 1.0
Content-Type: text/plain
Content-Transfer-Encoding: 7bit From: antiques4you_n_me@yahoo.com
Sent: Tuesday, February 24, 2004 1:50 AM
To: rcastell@rockcastle.com
Subject: Re: Flooring contractor policy Rick,
Yes, they are fully licensed and insured.
Best Regards
Cathy Customer
```

*FIG. 16*

| | | | | | |
|---|---|---|---|---|---|
| View | Date & Time | From | To | Subject | Type | Files | Remove |
| View | 2/24/2004 11:26 am | Rick Castell | Cathy Customer | RE: Flooring contractor policy | E-mail | | Remove |
| View | 2/24/2004 1:50 am | Cathy Customer | Rick Castell | Re: Flooring contractor policy | E-mail | | |
| View | 2/24/2004 1:05 am | Rick Castell | Cathy Customer | Flooring contractor policy | E-mail | | Remove |
| View | 2/24/2004 12:14 am | Cathy Customer | Rick Castell | Re: Thank you for choosing Rock Castle !! | E-mail | | Remove |
| View | 2/23/2004 11:20 pm | Rick Castell | Cathy Customer | Thank you for choosing Rock Castle !! | E-mail | | Remove |

FIG. 19

MESSAGE TRACKING FUNCTIONALITY BASED ON THREAD-RECURRENT DATA

CROSS-REFERENCE TO RELATED APPLICATIONS

This application is a continuation of U.S. patent application Ser. No. 10/796,718, filed Mar. 8, 2004, titled "INTEGRATING A WEB-BASED BUSINESS APPLICATION WITH EXISTING CLIENT-SIDE ELECTRONIC MAIL SYSTEMS" and having the contents of which are hereby incorporated in their entirety by reference.

FIELD

This patent specification relates to web-based business applications. More particularly, this patent specification relates to a method, system, computer program product, and related business methods for integrating a web-based business application with a broad variety of client-side electronic mail systems.

BACKGROUND

The ability of business users to manage crucial business information has been greatly enhanced by the proliferation of IP-based networking together with advances in object oriented Web-based programming and browser technology. Using these advancements, systems have been developed that permit web-based access to business information systems, thereby allowing any user with a browser and an Internet or intranet connection to view, enter, or modify the required business information.

As used herein, the term web-based business application or web-based business information system generally refers to a business software system having browser-based access such that an end user requires only a browser and an Internet/intranet connection on their desktop, laptop, network appliance, PDA, etc., to obtain substantially complete access to that system. Examples of web-based business applications include those described in the commonly assigned U.S. Ser. No. 10/406,915 and U.S. Ser. No. 10/665,308, each of which is incorporated by reference herein. Further examples of web-based business applications include application service provider (ASP) hosted services provided by NetSuite, Inc. of San Mateo, Calif. such as NetSuite™, Oracle® Small Business Suite, NetCRM™, and NetERP™. A further example of a web-based business application is discussed in the literature referencing the web-based business application maintained by Salesforce.Com, Inc. of San Francisco, Calif. Web-based business applications can also be implemented using non-ASP models having different hosting mechanisms, such as with self-hosted systems in which a business enterprise operates and maintains its own private, captive business information system having browser-based access across an intranet and/or the Internet. As described in the above-reference patent applications, a commercial enterprise can achieve many functional and strategic advantages by using a web-based business information system comprising integrated ERP (Enterprise Resource Planning), CRM (Customer Relationship Management), and other business capabilities.

One factor that can affect the success of a web-based business information system relates to the degree to which it can integrate with the native e-mail system of the end user. As used herein, the term "native" e-mail system refers to an end user's conventional e-mail application or e-mail service lying outside the web-based business information system itself. Although a web-based business information system may itself offer an internal e-mail utility, with messages being sent and received by the end user from within that system's browser window, it is very common for end users to have a preferred native e-mail system. The end user's native e-mail system can be a dedicated e-mail application running on the end user's computer (e.g., Outlook, Eudora, etc.) that interacts with an e-mail server, or can alternatively be a web-hosted e-mail service (e.g. Yahoo!Mail, Hotmail, etc.) having browser-based access. As used herein, the term "client-side" e-mail system also refers to a native e-mail system, because even web-hosted e-mail services can be thought of as "client-side" applications relative to the web-based business information system that is being accessed by the end user. By way of further terminology clarification, as used herein, the term "system user" can be used synonymously with "end user", both referring to the person who is using the web-based business information system.

By way of further clarifying example, a hypothetical company Company_X might subscribe to a web-based business information system from a hypothetical ASP service provider "WebCRM." With respect to the web-based business information system's internal mail utility, an employee Employee_A of Company_X would typically have an e-mail address of employee_a.company_x@webcrm.com. If Company_X has its own domain "company_x.com," then Employee_A would also typically have a native e-mail system such as Outlook and a native e-mail address of employee_a@company_x.com. Alternatively, Company_X might require its employees to fend for themselves with regard to e-mail, whereby Employee_A's native e-mail system could be the Yahoo!Mail service, with Employee_A's native e-mail address being employee_a657@yahoo.com.

Especially in the context of CRM functionality, but also in other contexts such as supplier and vendor management, it is desirable for a business software system to accommodate orderly tracking of e-mail communications between end users and their external contacts. As used herein, an external contact generally refers to an e-mail location lying outside the domain of the web-based business information system, e.g., outside the domain "webcrm.com" in the above example. Typical examples of external contacts include customers, sales leads, partners, vendors, suppliers, and the like. However, external contacts can also include co-workers of the end user when they are contacted at their native e-mail address, e.g., employee_b@company_x.com.

Tracking of an e-mail communication refers to the creation of at least one record or metadata object that can be used to facilitate future reference to the contents of that communication from within the web-based business information system. Tracking methods can range from simple schemes generating flat-file listings on a per-end user, per-recipient basis to more complex schemes involving message content analysis and indexing.

Generally speaking, known prior art web-based business information systems can effectively track e-mail communications between an end user and their external contacts only for communications arising directly out of the system's internal e-mail utility. If the end user instantiates an e-mail thread with an external contact from their native e-mail system, that information is not automatically tracked by the web-based business information system. In such case, manual inputs such as event creation and cut-and-paste operations are required to get those communications into the web-based business information system, which is highly undesirable.

Accordingly, it would be desirable to provide a web-based business information system that is capable of automatically tracking e-mail communications between an end user and an external contact while allowing the end user to utilize their preferred native e-mail system for at least a portion of those communications.

It would be further desirable to provide a web-based business information system having such automated e-mail tracking ability that is functional across a wide variety of different native e-mail systems, including both dedicated e-mail application software and web-based e-mail services.

It would be still further desirable to provide a web-based business information system having such automated e-mail tracking ability that does not rely upon specialized software, such as browser plug-ins, at the end user computer.

It would be even further desirable to provide a web-based business information system that can automatically track such e-mail communications regardless of the external contact's e-mail system type.

It would be even further desirable to provide a web-based business information system in which any artifacts associated with such automated tracking would be reasonably transparent to the external contact.

It would be still further desirable to provide such tracking capability in a web-based business information system that has security safeguards against tampering or other compromise of the requisite tracking information.

SUMMARY

A method, system, computer program product, and related business methods are provided in the context of a web-based business information system having an internal e-mail facility, wherein e-mail communications between a native e-mail system of an end user of the web-based business information system and an external contact are facilitated and automatically tracked by the web-based business information system, the native e-mail system lying outside the web-based business information system but often being preferred by the end user over its internal e-mail facility. A local part of a REPLY-TO field of an initial e-mail message sent from the internal e-mail facility to the external contact includes a tracking string encoding tracking information associated with the end user and the external contact with respect to the web-based business information system. A domain of the REPLY-TO field of the initial e-mail message corresponds to a domain of the internal mail facility. The external contact presses "reply" in their e-mail application and sends a first reply e-mail message having a TO field that includes the tracking string. Upon receipt of the first reply e-mail message, the web-based business information system sends a modified version thereof to the native e-mail address of the end user, the modified version having a REPLY-TO field with a domain corresponding to the domain of the internal e-mail facility and a local part including a first modified version of the tracking string. The end user presses "reply" in the native e-mail application and sends a second reply e-mail message having a TO field that includes the first modified version of the tracking string. Upon receipt of the second reply e-mail message, the web-based business information system sends a modified version thereof to the native e-mail address of the external contact, the modified version having a REPLY-TO field with a domain corresponding to the domain of the internal e-mail facility and a local part including a second modified version of the tracking string, and the process can be repeated.

In an alternative preferred embodiment, the FROM field can be used rather than the REPLY-TO field to carry the tracking string information. In still other preferred embodiments, other thread-recurrent e-mail fields can be used. The web-based business information system automatically archives the above e-mail messages and automatically tracks them according to the contents of the tracking strings and various predetermined profiles associated with the end user and/or the external contact. The described preferred embodiments provide for easy-to-use, reasonably transparent, "no-click" integration of the web-based business information system with the end user's native e-mail system in a manner that is independent of the particular type and choice of native e-mail system.

BRIEF DESCRIPTION OF THE DRAWINGS

FIG. 10 illustrates a message header and body received by a native e-mail system of an end user;

FIG. 13 illustrates a messages tab of the Customer screen of FIG. 4 comprising a log of an e-mail thread between an end user and an external contact tracked according to a preferred embodiment;

FIG. 16 illustrates a message header and body received by a native e-mail system of an end user;

FIG. 19 illustrates a messages tab of the Customer screen of FIG. 4 comprising a log of an e-mail thread between an end user and an external contact tracked according to a preferred embodiment.

DETAILED DESCRIPTION

Figure 1:
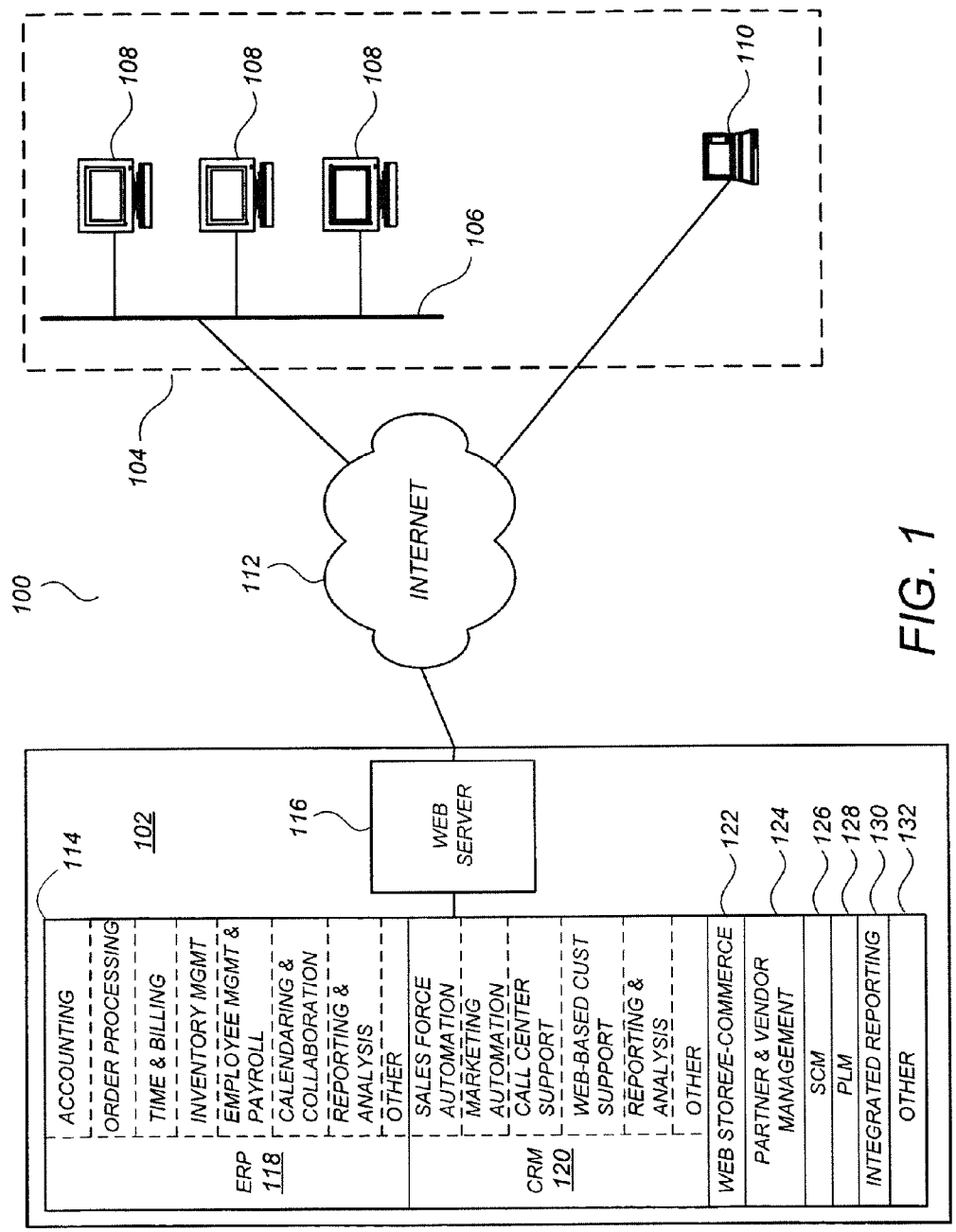
FIG. 1 illustrates a conceptual diagram of a computer network including an enterprise network and a web-based business information system according to a preferred embodiment.

FIG. 1 illustrates a conceptual diagram of a network 100 including a web-based business information system 102 and an enterprise network 104 into which the features and advantages of one or more preferred embodiments may be realized. Enterprise network 104 is associated generally with a business enterprise that may be as small as a single-employee sole proprietorship or as large as a multinational corporation having many different facilities and internal networks spread across many continents. Alternatively, and in accordance with the advantages of an application service provider (ASP) model, the business enterprise may comprise no dedicated facilities or business network at all, provided that its end users have access to an internet browser and an internet connection. For simplicity and clarity of explanation, the enterprise network 104 is simply represented by an on-site local area network 106 to which a plurality of personal computers 108 is connected, each generally dedicated to a particular end user although such dedication is not required, along with an exemplary remote user computer 110 that can be, for example, a laptop computer of a traveling employee having internet access through a hotel, coffee shop, a public Wi-Fi access point, or other internet access modality. The end users associated with computers 108 and 110 may also each possess a personal digital assistant (PDA) such as a Blackberry, Palm, Handspring, or other PDA unit having wireless internet access and/or cradle-based synchronization capabilities. Users of the enterprise network 104 interface with the web-based business information system 102 across the Internet 112.

Web-based business information system 102, which in this example is a dedicated third party ASP, comprises an integrated business server 114 and a web server 116 coupled as shown in FIG. 1. It is to be appreciated that either or both of the integrated business server 114 and the web server 116 may actually be implemented on several different hardware systems and components even though represented as singular units in FIG. 1. Integrated business server 114 comprises an ERP functionality as represented by ERP module 118, and further comprises a CRM functionality as represented by CRM module 120. It is to be appreciated that identification herein of business functionalities with modules does not limit the scope of the preferred embodiments to segregated units thereof. In many preferred embodiments the ERP module 118 may share methods, libraries, databases, subroutines, variables, etc., with CRM module 120, and indeed ERP module 118 may be intertwined with CRM module 120 into a larger integrated code set without departing from the scope of the preferred embodiments.

It is to be appreciated that FIG. 1 is a simplified conceptual illustration presented so as to clearly describe the preferred embodiments herein. A variety of computing, storage, and networking hardware associated with the enterprise network 104 and the web-based business information system 102, such as e-mail servers, databases, application servers, internet gateways, internal and external routers, security devices, internet service provider facilities, and related software protocols and methods necessary for operation are known in the art and need not be detailed here. Examples of such known computing, storage, and networking hardware can be found, for example, in US2002/0152399A1 and US2002/0169797A1, which are incorporated by reference herein. Similarly, in view of the present disclosure, a person skilled in the art would be able to construct software packages capable of achieving the business data communication, presentation, input, editing, e-mail archiving, and rules-based e-mail tracking functionalities described herein without undue experimentation, using publicly available programming tools and software development platforms.

In a preferred embodiment similar to NetSuite™, supra, the ERP module 118 comprises an accounting module, an order processing module, a time and billing module, an inventory management module, an employee management and payroll module, a calendaring and collaboration module, a reporting and analysis module, and other ERP-related modules. The CRM module 120 comprises a sales force automation (SFA) module, a marketing automation module, a contact list module (not shown), a call center support module, a web-based customer support module, a reporting and analysis module, and other CRM-related modules. The integrated business server further 114 further provides other business functionalities including a web store/e-commerce module 122, a partner and vendor management module 124, and an integrated reporting module 130. These functionalities are seamlessly integrated and executed by a single code base accessing one or more integrated databases as necessary. In another preferred embodiment, an SCM module 126 and PLM module 128 is provided. Web server 116 is configured and adapted to interface with the integrated business server 114 to provide web-based user interfaces to end users of the enterprise network 104. Version 9.0 of the NetSuite™ product line, which was placed on public sale by NetSuite, Inc. of San Mateo in September 2003, represents one example of a web-based business information system with native e-mail integration according one or more of the preferred embodiments described herein.

In an alternative preferred embodiment (not shown), one or more of the above business modules may be implemented by functionally separate servers and/or platforms that communicate with each other and with an integration server (not shown) over a LAN, a WAN, or the Internet. Protocols that may be used to facilitate inter-server communications include smbXML and qbXML.

It is to be appreciated that the scope of the preferred embodiments is not limited to the scenario of FIG. 1 in which the web-based business information system 102 is an integration of many different business functionalities. In other preferred embodiments, the web-based business information system 102 may have a single business management functionality, e.g., it may consist only of an SFA system, or only of a vendor management system. In still other preferred embodiments, the web-based business information system 102 may comprise different combinations of these functionalities.

Figure 2:
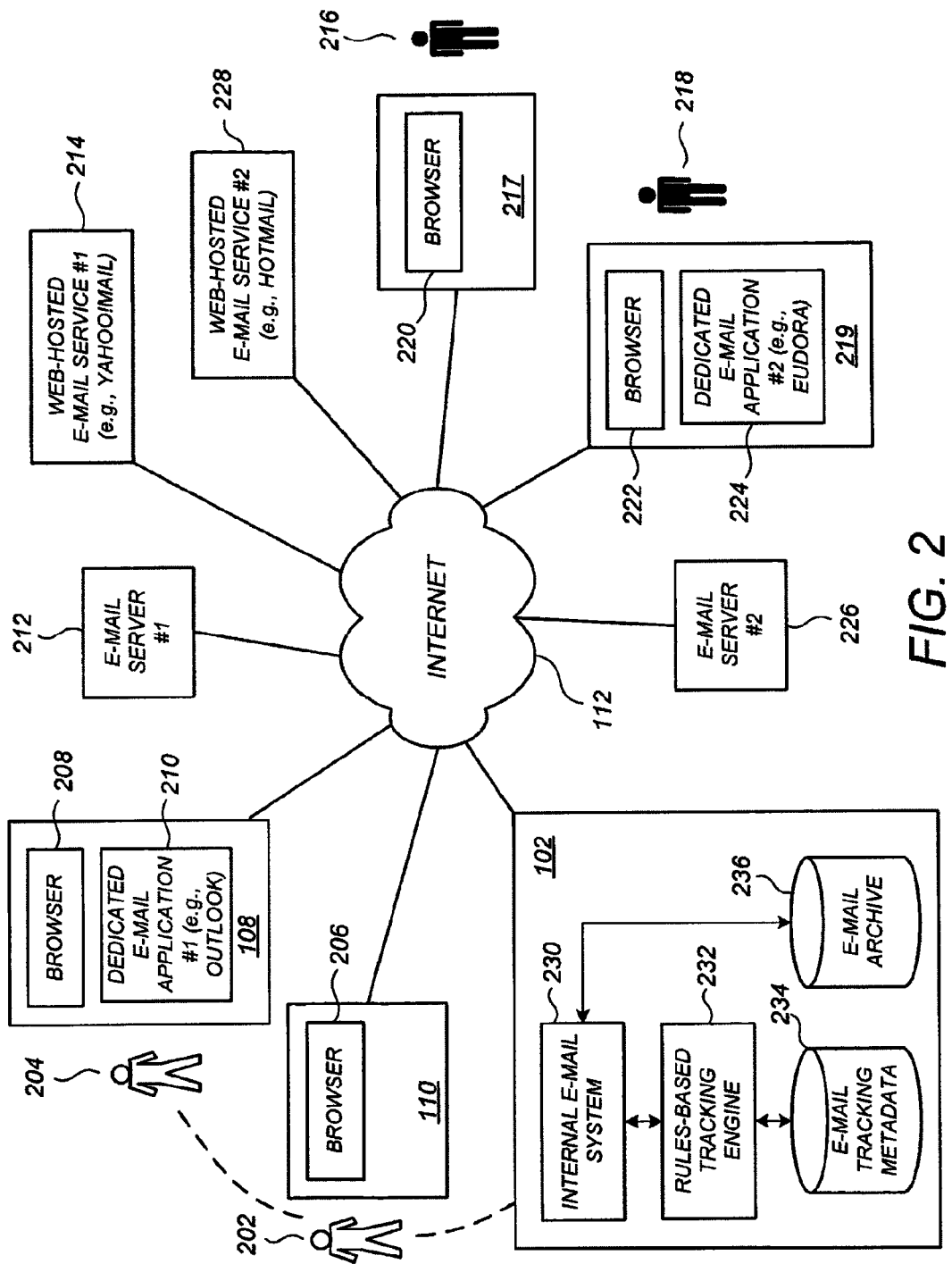
FIG. 2 illustrates a conceptual diagram of the web-based business information system of FIG. 1 as related to its integration with native e-mail applications according to a preferred embodiment.

FIG. 2 illustrates a conceptual diagram of the web-based business information system 102 as functionally related to its integration with native e-mail applications according to a preferred embodiment. For purposes of clarity, and without loss of generality, each node is connected directly to the Internet 112, it being understood that there will usually be various network segments, subnets, intranets, etc., around which the various components are distributed. Shown in FIG. 2 are end users 202 and 204 who user the web-based business information system 102, and who are also termed system users herein. End user 202, who is operating the computer 110, accesses the web-based business information system 102 using a browser 206. End user 204, who is operating the computer 108, accesses the web-based business information system 102 using a browser 208. In one preferred embodiment, the browsers 206 and 208 are Microsoft Internet Explorer, Version 5.5 or later, and are preferably kept up-todate to the latest release available. A dotted line is shown among end user 202, end user 204, and web-based business information system 102 to indicate that they are associated with the same business enterprise.

In the example of FIG. 2, end user 202 has a preferred native e-mail system that is a web-hosted e-mail service 214, such as Yahoo!Mail. End user 204 has a preferred native e-mail system that is a dedicated e-mail application 210, such as Microsoft Outlook, that accesses an e-mail server 212 on behalf of end user 204. End users 202 and 204 have browser-based access to the web-based business information system 102. Web-based business information system 102 comprises an internal e-mail system 230 that the end users 202 and 204 can use to send and receive e-mails. However, as indicated previously, for any of a variety of reasons, it is often that case that the end users 202 and 204 prefer their native e-mail applications.

Web-based business information system 102 further comprises a rules-based tracking engine 232 that is generally capable of electronic mail tracking in accordance with the functionalities described herein. Web-based business information system 102 further comprises an e-mail tracking metadata database 234 that stores the tracking information associated with the e-mail communications, and an e-mail archive 236. In addition to creating the data stored in the e-mail tracking metadata database 234 as the e-mail communications are flowing, the rules-based tracking engine 232 also accesses existing data according to user commands to facilitate location and retrieval of contents previously stored in e-mail archive 236.

The example of FIG. 2 further includes external contacts 216 and 218. External contact 216 operates a computer (or other network-connected device) 217 and external contact 218 operates a computer 219. External contact 216 has a preferred native e-mail system that is a web-hosted e-mail service 228, such as Hotmail, that is accessible using the browser 220. End user 218 has a preferred native e-mail system that is a dedicated e-mail application 224, such as Eudora, that accesses an e-mail server 226 on behalf of end user 218.

Advantageously, the e-mail tracking functionalities described herein according to the preferred embodiments are designed to operate independently of whatever particular native e-mail system is used by the end users 202/204 or external contacts 216/218. It is not required that the end users have the same type of native e-mail system as each other, and not required that any particular end user have the same type of native e-mail system as any particular external contact. The e-mail tracking functionalities described herein are equally operable for e-mail threads between any of the following end user-external contact pairs of FIGS. 2: 202-216, 202-218, 204-216, and 204-218. The only requirement for any of the native e-mail systems is that they operate in substantial accordance with the REPLY-TO option set forth in the international standards document "Internet Message Format," IETF (Internet Engineering Task Force) RFC 2822, and/or its predecessor or successor specifications. In particular, it is required that when the e-mail user presses "reply" for a given received e-mail message, the reply e-mail comprises the REPLY-TO address specified in the received e-mail message, if one was specified. No e-mail system is known to the applicants as of the date of this patent application that does not operate according to this requirement, although there are some slight variations with respect to optional comment fields in the REPLY-TO address. However, it has been found that these variations do not affect the tracking, forwarding, and archiving functionalities themselves, but rather only moderately affect the "transparency" of the method to the external contact and/or the end user.

In accordance with RFC 2822, an e-mail message consists of header fields, collectively called "header" of the message, followed optionally by a body. The header is a sequence of lines of characters with special syntax as defined in RFC 2822. The body is simply a sequence of characters that follows the header and is separated from the header by an empty line (i.e., a line with nothing preceding a CRLF). Header fields are lines composed of a field name, followed by a colon (":"), followed by a field body, and terminated by CRLF.

Among a variety of other header fields is specified a FROM header field and an optional REPLY-TO header field. For clarity of presentation, these header fields are described herein for single originators and recipients, it being understood that the scope of the preferred embodiments is not so limited. After the "FROM:" and "REPLY-TO:" character strings, respectively, is specified the string "display-name<local-part@domain>". "Display-name" is an optional display name that indicates the name of the recipient, which could be a person or a system, that could be displayed to the user of an e-mail application. "Domain" is the Internet domain, and the "local-part" is specified as a domain dependent string that, in addresses, is simply interpreted on the particular host as a name of a particular mailbox.

RFC 2822 states that the REPLY-TO field, if present, indicates the mailbox to which the author of the message suggests that replies be sent. In the absence of the REPLY-TO, replies should by default be sent to the mailbox specified in the FROM field unless otherwise specified by the person composing the reply.

As used herein, the term e-mail address refers to the combination of all three of the display name, local part, and domain when a display name is provided, and to the combination of just the local part and domain where a display name is not provided. It has been observed that e-mail systems can differ in their treatment of the e-mail address with respect to the components displayed on the user interface in different situations, and with respect to selective stripping of the display name in different situations. For example, it sometimes happens that an e-mail system will omit a display name in the TO-field of a reply message even when that display name was indeed provided in the REPLY-TO e-mail address. Importantly, however, the preferred embodiments described herein take advantage of the fact that all known e-mail systems refrain from stripping out the local part of the e-mail address in virtually all circumstances. In the preferred embodiments described herein, the differences in display name treatment among the various e-mail systems only affect the relative "transparency" of the method to external contacts.

Figure 3A:
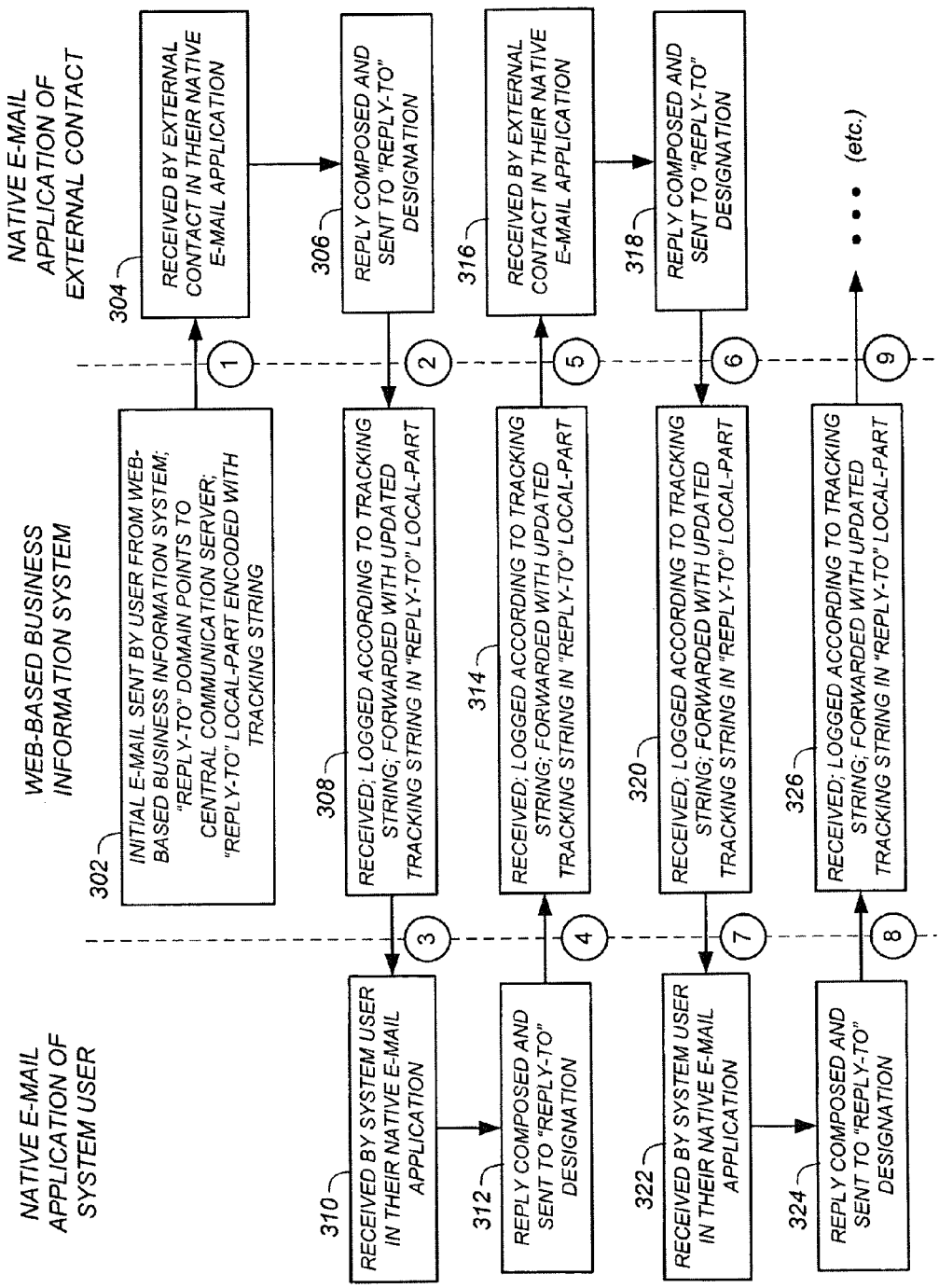
FIG. 3A illustrates steps of a method for electronic mail tracking in a web-based business information system environment according to a preferred embodiment.

FIG. 3A illustrates a method for electronic mail tracking in a web-based business information system environment according to a preferred embodiment. At step 302 an initial e-mail message is sent by an end user of the web-based information system to an external contact in which a REPLY-TO header field is populated with an e-mail address having a local part that is encoded with message tracking information. The encoded message tracking information can also be termed a tracking string. The REPLY-TO e-mail address comprises a domain identifier of a central communication server, i.e., an e-mail server that is associated with the internal e-mail utility of the web-based business information system. Most commonly, the central communication server and the internal e-mail utility will be one and the same element. In other preferred embodiments, the central communication server can be a different e-mail server that is tied to the internal e-mail utility. The initial e-mail message sent at step 302 is automatically logged and a copy of that message is automatically archived by the web-based business information system.

The initial e-mail message sent at step 302 contains a TO e-mail address according to an external contact profile stored in the web-based business information system. Preferably, the external contact profile includes a display name appropriate for that external contact for inclusion in the TO e-mail address. Even more preferably, such display name would be identical to a native display name of that external contact in their native e-mail system, if that information is known.

Preferably, the REPLY-TO e-mail address of the initial e-mail message sent at step 302 also includes a display name that is identical to a native display name of the end user in their native e-mail system. The display name is stored in an end user profile for that end user in the web-based business information system. In an alternative preferred embodiment, this display name can be customized to each individual external contact on a per-external-person or per-external-organization basis. In such alternative preferred embodiment, the web-based business information system would store end user display names in matrix form, with different entries for different external contacts for a given end user.

Preferably, the FROM e-mail address of the initial e-mail message sent at step 302 is set to the native e-mail address of the end user. This makes it appear to the external contact that they are receiving the e-mail directly from the native e-mail address of the end user. Preferably, the native display name of the end user is included in the FROM e-mail address for display to the external contact.

At step 304, the initial e-mail sent at step 302 is received by the external contact in their native e-mail system. In most common e-mail systems, the message will appear to the external contact as if it came from the native e-mail system of the end user. At step 306, the external contact presses an onscreen "reply" button of their native e-mail system, or other command that instantiates a first reply e-mail. By operation of the native e-mail system of the external contact, the first reply e-mail automatically has a TO field that corresponds to the REPLY-TO of the initial e-mail message. Advantageously, in many of today's common e-mail systems, the external contact will still "feel" like they are replying to the end user's native e-mail system, because only the display name of the TO e-mail address will be seen on their monitor. In other known e-mail systems, this desirable effect will be moderated somewhat by the appearance of the relatively complex "local-part@domain" on their monitor. Notably, the FROM and REPLY-TO addresses of the first reply e-mail do not need to be referenced by the central communication server.

At step 308 the first reply e-mail is received at the central communication server, archived, and automatically logged according to the contents of the tracking string contained in the TO e-mail address thereof. Also at step 308, a forwarded version of the first reply e-mail is created and sent to the native e-mail address of the end user, with its REPLY-TO local part being populated with an updated version of the tracking string. At step 310, the forwarded version of the first reply e-mail is received in the native e-mail application of the end user.

In one preferred embodiment, the display name of the end user is not included in the TO e-mail address of the forwarded version of the first reply e-mail, thereby ensuring the raw "local-part@ domain" form of the end user's e-mail address to be displayed on the monitor of the end user's native e-mail system. Moreover, the display name of the REPLY-TO address is populated with a "local-part@domain" form of the external contact's native e-mail address. In many circumstances it will be desirable to keep things literal like this for the end user, because the end user is generally "wise" to the scheme anyway. Also, it is possible that the end user would like to be assured that the e-mail thread is indeed being processed through the central communication server for proper logging and tracking.

At step 312, the end user presses "reply" to instantiate composition of a second reply e-mail. By operation of the native e-mail system of the end user, the second reply e-mail automatically has a TO field that corresponds to the REPLY-TO field of the forwarded version of the first reply e-mail. Notably, the FROM and REPLY-TO address of the first reply e-mail do not need to be referenced by the central communication server.

At step 314 the second reply e-mail is received at the central communication server, archived, and automatically logged according to the contents of the tracking string contained in the TO e-mail address thereof. Also at step 314, a forwarded version of the second reply e-mail is created and sent to the native e-mail address of the external contact, with its REPLY-TO field being populated with a second modified version of the tracking string. At step 316, the forwarded version of the second reply e-mail is received in the native e-mail application of the external contact. The forwarded version of the second reply e-mail has TO and FROM fields that are the same as the initial e-mail sent at step 302, to continue promoting the external contact's illusion of direct communication with the end user's native e-mail system. Steps 316-326 then proceed in a manner analogous to steps 304-314, respectively, and the process can be repeated.

Without loss of generality, and for clarity of disclosure, FIG. 3B through FIG. 20 illustrate a particular exemplary scenario with respect to a hypothetical business enterprise called Rock Castle Construction having a web-based business information system provided by NetSuite. In this particular example, a hypothetical employee Rick Castell is an end user similar to end user 204 of FIG. 2, i.e. having a dedicated native e-mail application (Microsoft Outlook) on his desktop. Rick Castell has a native e-mail address of rcastell@rockcastle.com and a native display name of "Rick Castell".

Figure 4:
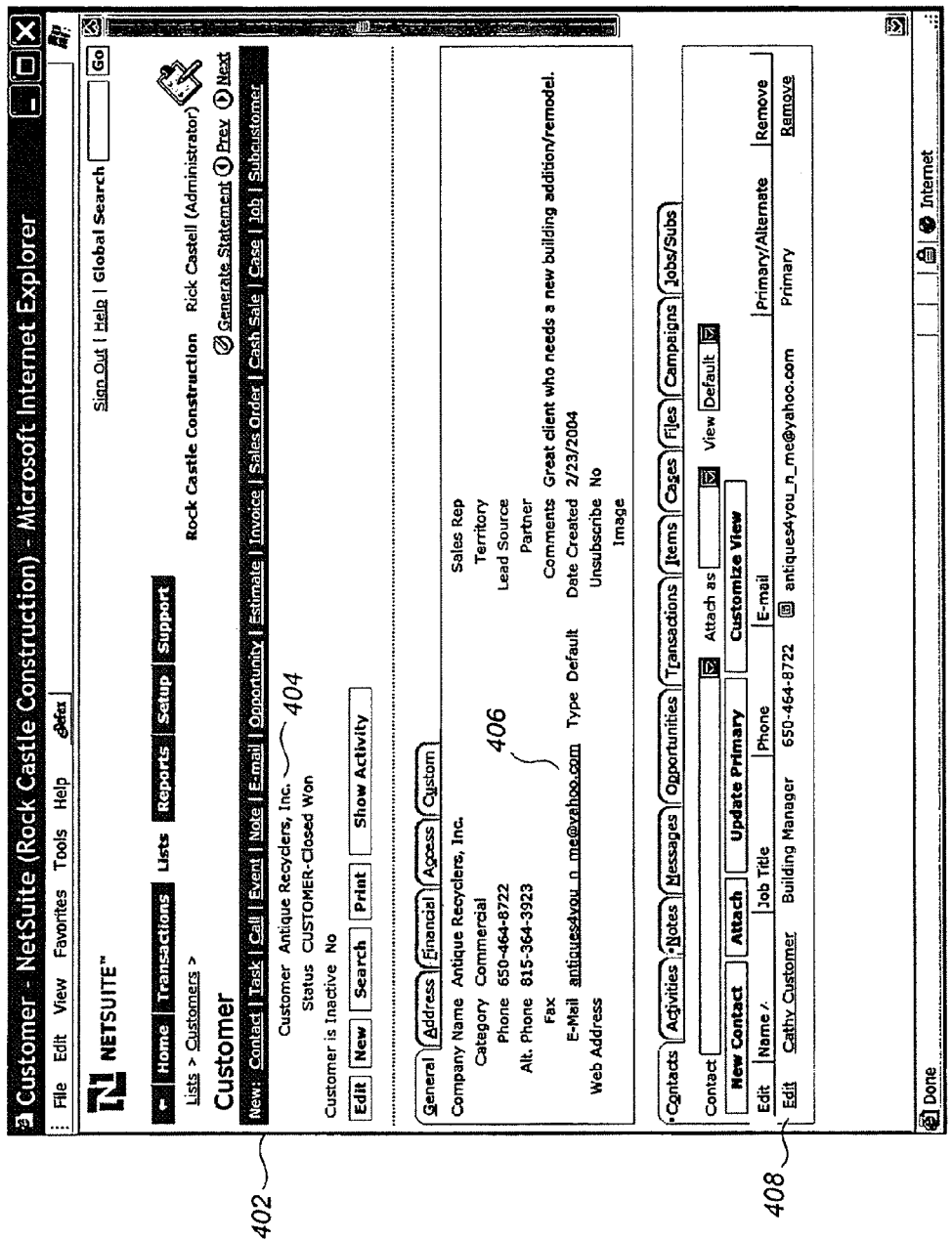
FIG. 4 illustrates a "Customer" screen of the web-based business information system.

FIG. 4 illustrates a "Customer" page 402 provided by the web-based business information system that provides convenient access to many aspects of a particular customer. Further to this example, Antique Recyclers, Inc. 404 is a new client of Rock Castle Construction. Antique Recyclers has no affiliation with the web-based business information system (NetSuite) used by Rock Castle Construction. Antique Recyclers has a native e-mail application that is a web-hosted e-mail service provided by Yahoo!Mail, and its single e-mail (address antiques4you_n_me@yahoo.com 406) is used by its building manager, Cathy Customer (408). In this example, Antique Recyclers, Inc. and Cathy Customer are external contacts with respect to Rick Castell, the NetSuite end user.

Figures 1, 3B:
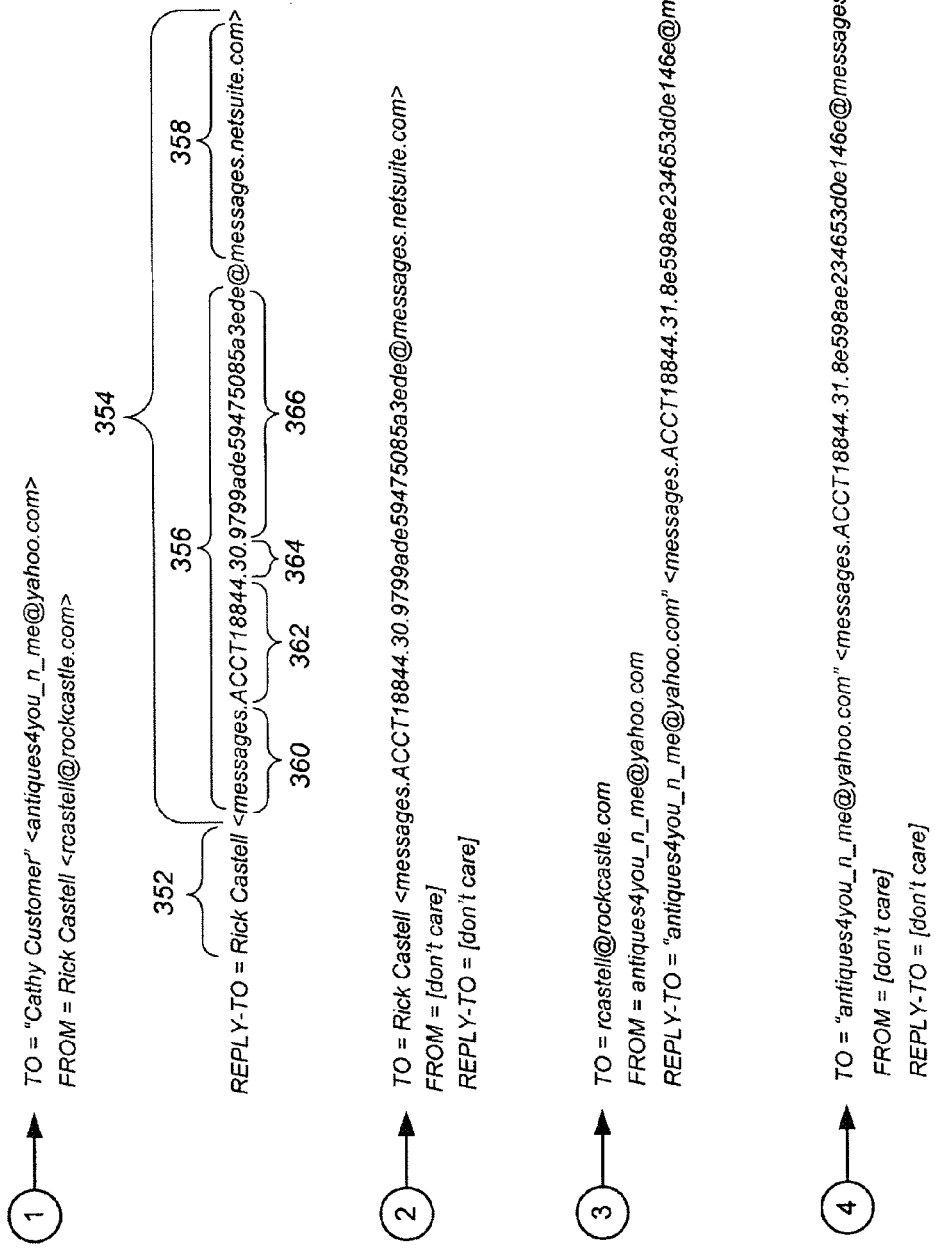
FIG. 3B illustrates the contents of TO, FROM, and REPLY-TO message header fields corresponding to an e-mail thread generated by an end user's native e-mail system, an external contact's native e-mail system, and the web-based business information system of FIG. 1 as integrated therewith according to a preferred embodiment.
Figures 2, 3B:
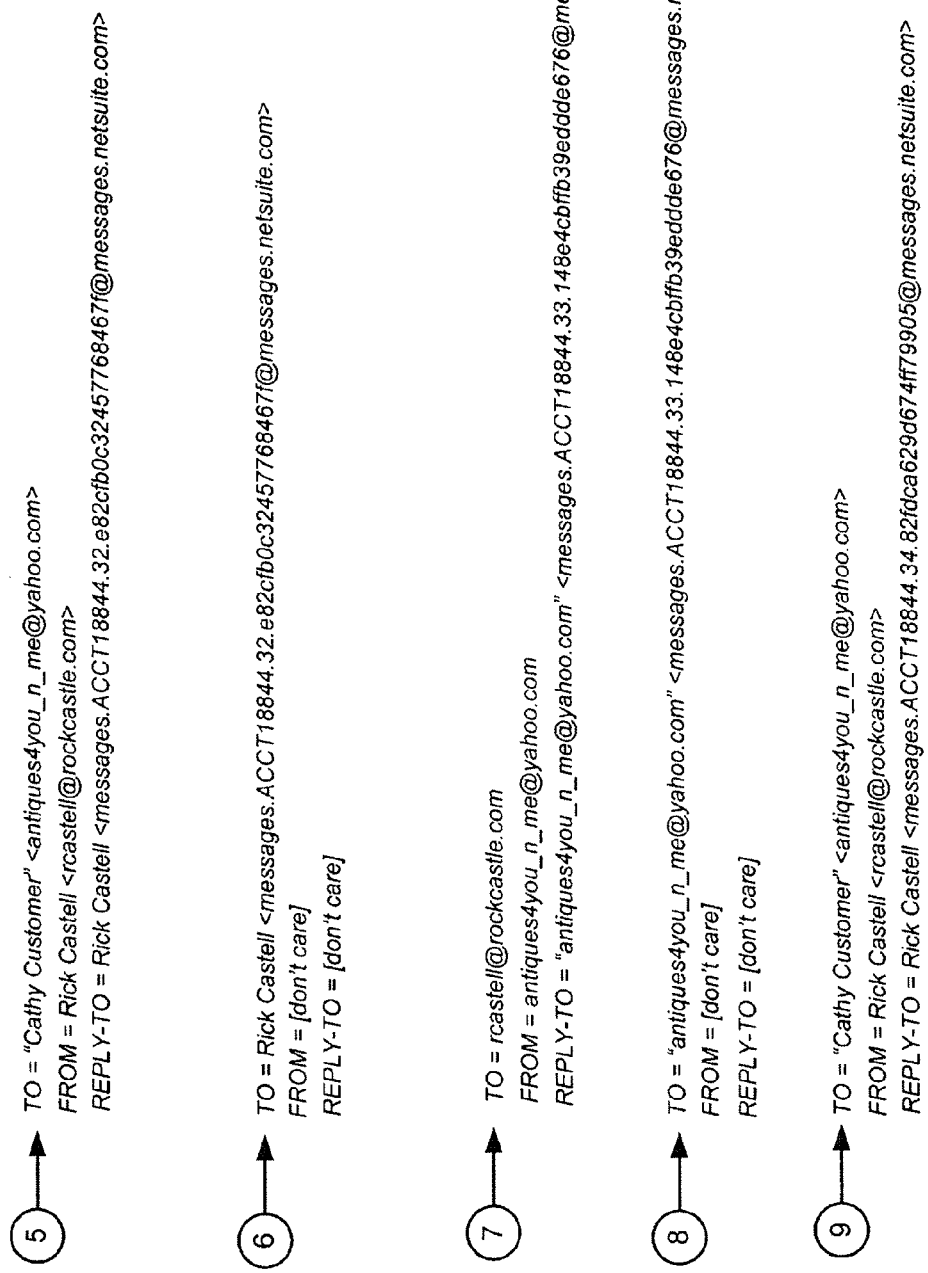
Figure 5:
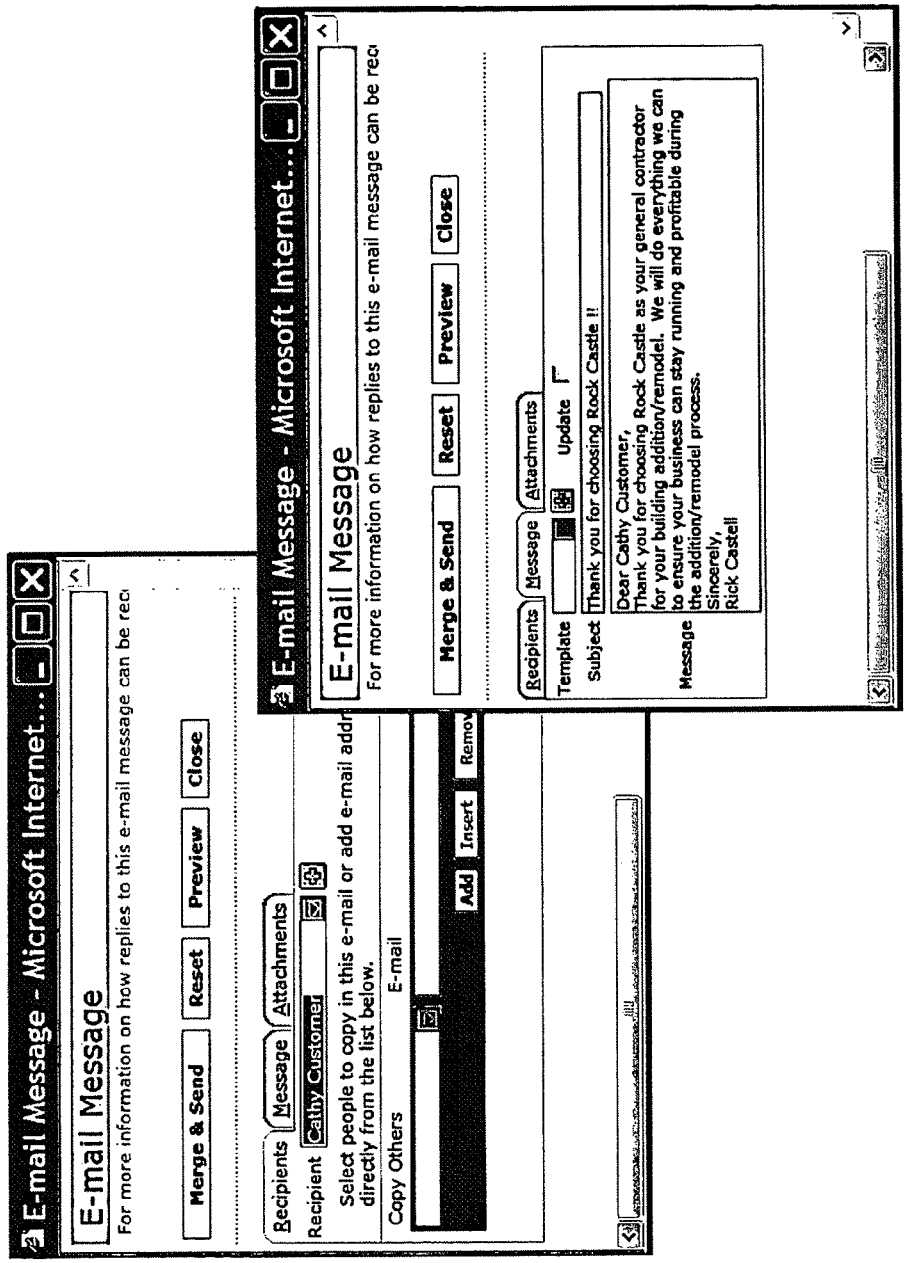
FIG. 5 illustrates e-mail messaging screens corresponding to an internal mail utility of the web-based business information system.

FIG. 5 illustrates browser screens used by end user Rick Castell to send the initial e-mail message referenced at step 302 of FIG. 3, supra. The appropriate end user profile data for Rick Castell and external contact profile data for Antique Recyclers, Inc have been previously populated in the web-based business information system.

Advantageously, once Rick Castell selects Cathy Customer as the recipient, the appropriate values for TO, FROM, and REPLY-TO are automatically populated. These values are identified by the number 1 in FIG. 3B. As illustrated in FIG. 3B, the REPLY-TO field of the initial e-mail comprises a display name 352 and an address specification 354, the address specification comprising a local part 356 and a domain 358. In accordance with a preferred embodiment, local part 356 is used as a tracking string to facilitate tracking and forwarded of the expected reply e-mail message.

Local part/tracking string 356 comprises a category identifier 360, a thread identifier 362, a counter 364, and a hash code 366. Collectively, the category identifier 360, thread identifier 362, and counter 364 provide sufficient information for tracking this particular e-mail thread and facilitating the forwarding operations described supra with respect to FIG. 3A.

It is to be appreciated that there are many known methods that can be used to organize the tracking string 356, all of which are within the scope of the preferred embodiments. In the present example, the category identifier 360 can be used to segregate e-mail threads by their broad category, with examples including "campaigns" for marketing campaigns, "cases" for customer trouble tickets, "messages" for general correspondence, "invitation replies" for replies to event invitations, and so on. Thread identifier 362 is used to associate the e-mail thread with the appropriate end user/external contact pair or grouping (Rick Castell and Cathy Customer), and optionally to encode other contextual information. Counter 364 assists in properly ordering records associated with the e-mail thread as would appear, for example, in a messages log. Hash code 366 is generated from information including the category identifier 360, thread identifier 362, and counter 364 using any of a variety of known hash algorithms for authenticating the message and inhibiting external (or internal) tampering therewith.

Figure 6:
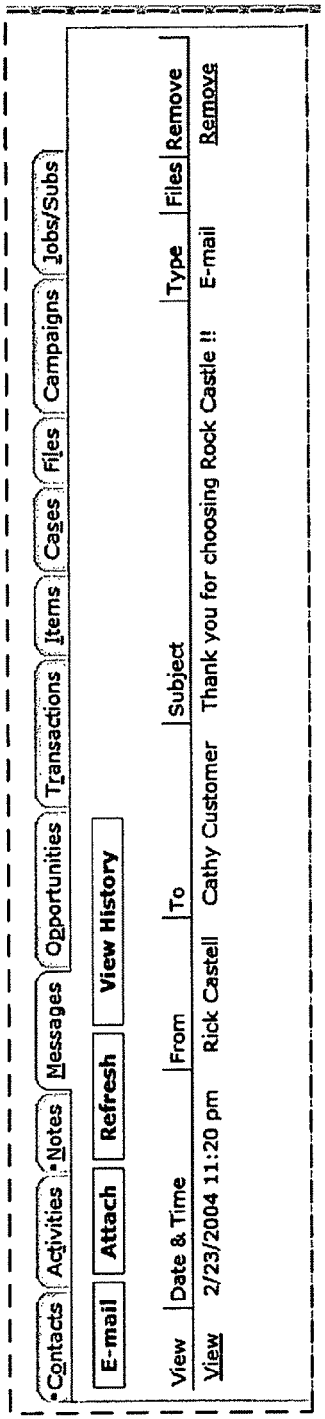
FIG. 6 illustrates a messages tab of the Customer screen of FIG. 4 comprising a log of an e-mail thread between an end user and an external contact tracked according to a preferred embodiment.

FIG. 6 illustrates a Messages tab of the Customer display 402 subsequent to step 302, which includes a communication log between the end user (Rick Castell) and the external contact (Cathy Customer). The sequential listing of e-mail communications represents but one example of the many useful actions that can be taken with the tracking information and e-mail messages archived in accordance with the preferred embodiments.

Figure 7:
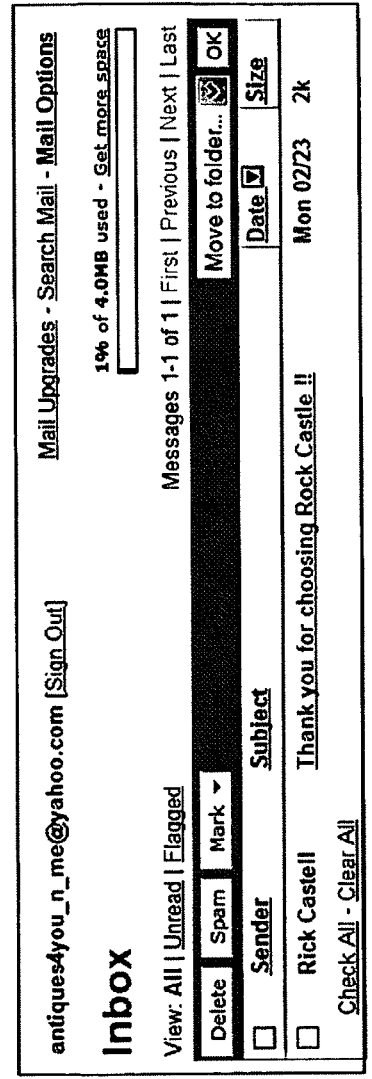
FIGS. 7-9 illustrate screens of a native e-mail system of an external contact.
Figure 8:
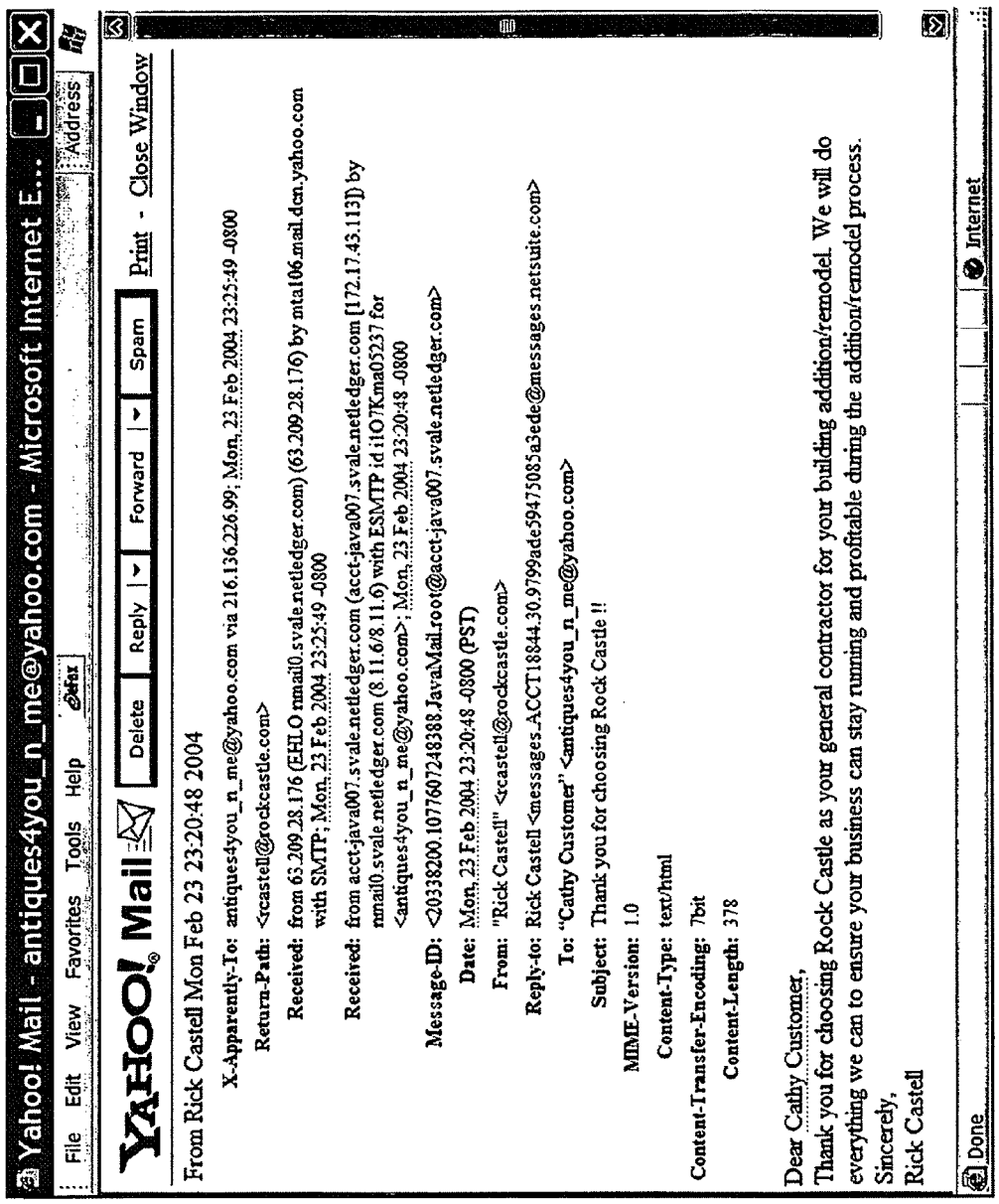
Figure 9:
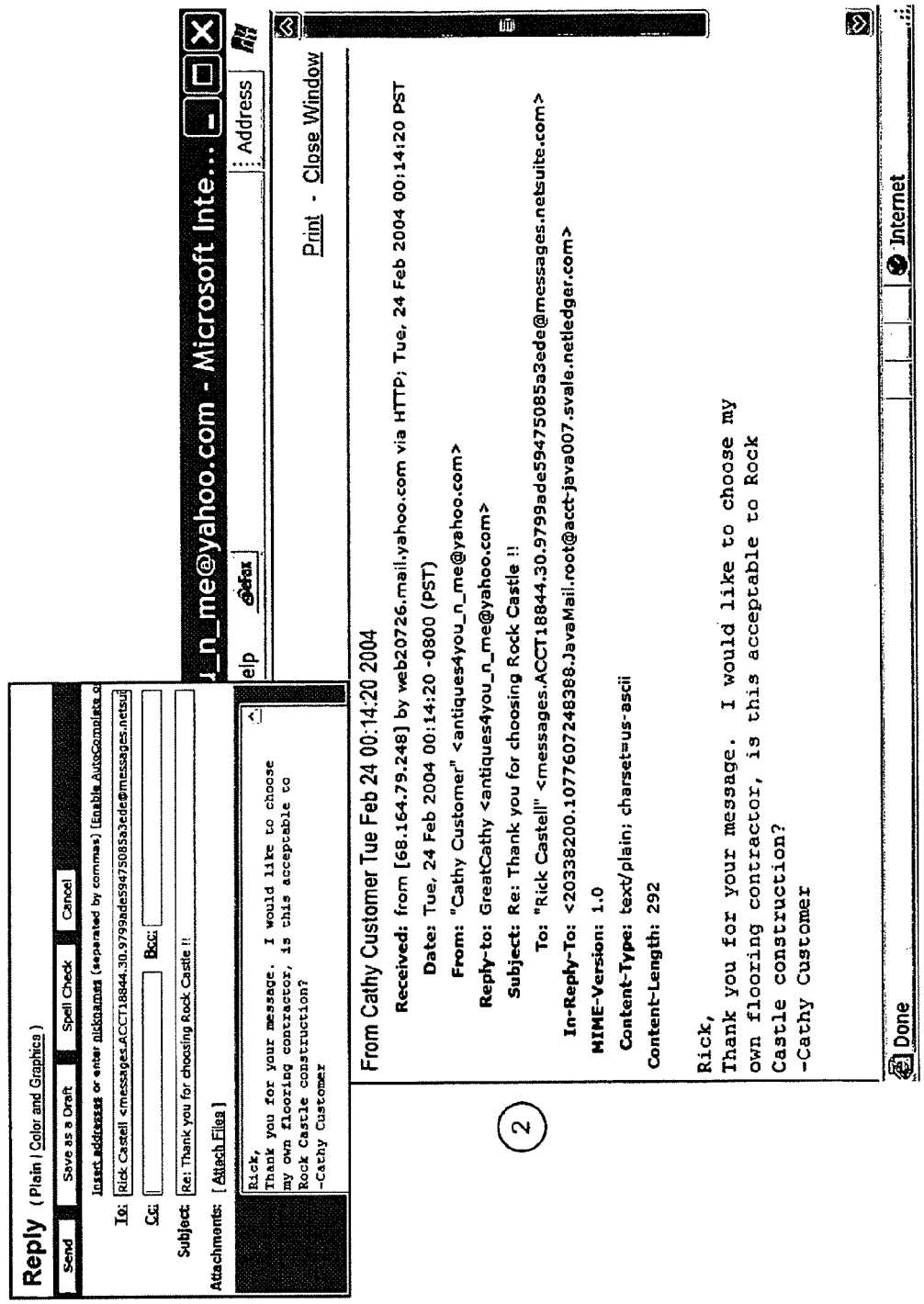

FIG. 7 illustrates an inbox of the native e-mail application (Yahoo!Mail) of the external contact, Cathy Customer, when the initial e-mail message arrives. FIG. 8 illustrates the message header and message body of the initial e-mail message received at step 304. FIG. 9 illustrates the external contact's user screen as the first reply e-mail is composed at step 306, as well as its message header and message body. FIG. 3B illustrates the TO, FROM, and REPLY-TO fields associated with the e-mail thread according to the sequential numerical identifiers shown in FIG. 3A (1, 2, 3, 4, etc.).

Figure 11:
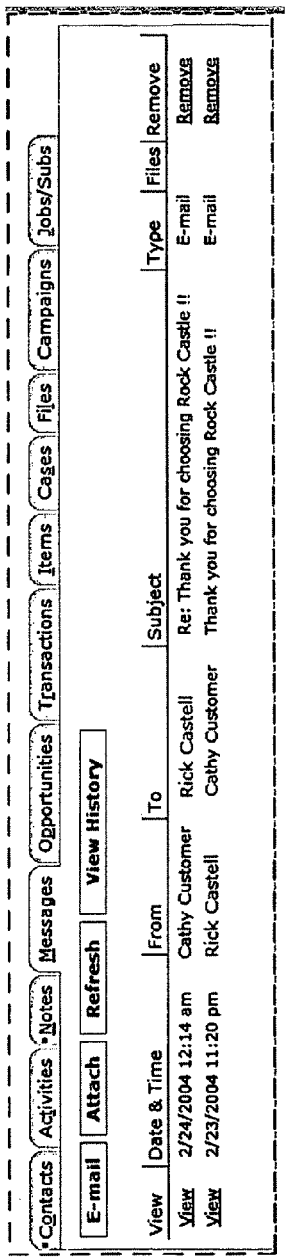
FIG. 11 illustrates a messages tab of the Customer screen of FIG. 4 comprising a log of an e-mail thread between an end user and an external contact tracked according to a preferred embodiment.
Figure 12:
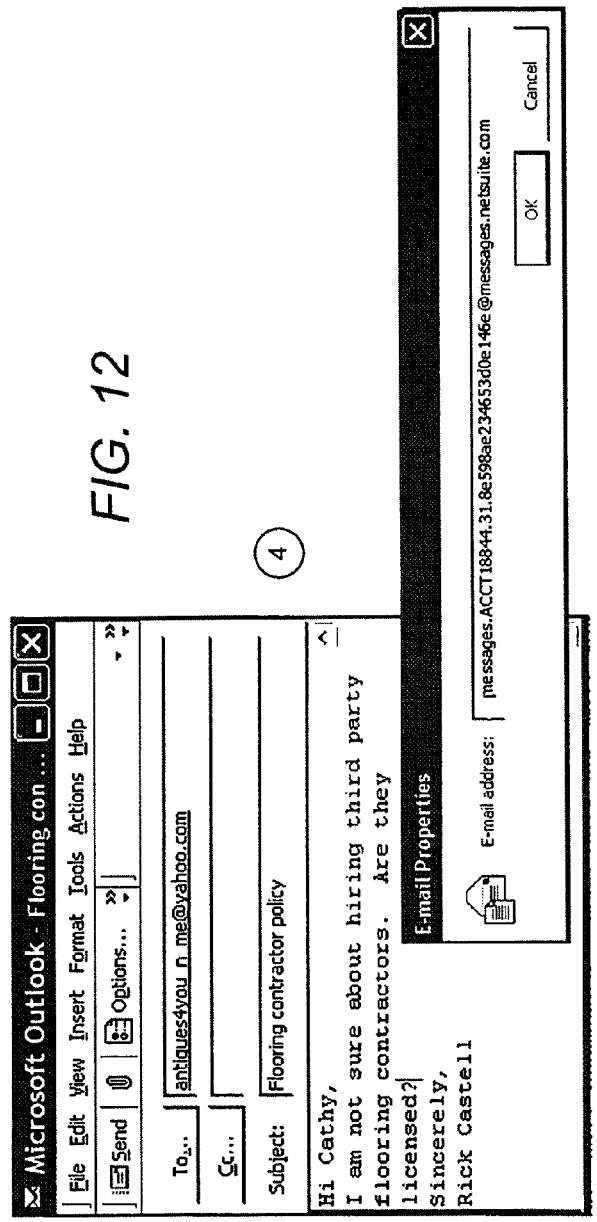
FIG. 12 illustrates screens of an end user's native e-mail system.

FIG. 10 illustrates the message header and message body of the forwarded version of the first reply e-mail received at step 310. FIG. 11 illustrates the Messages tab of the Customer display 402 subsequent to (or contemporaneously with) step 308, showing that the first reply e-mail has been processed. FIG. 12 illustrates a user interface of the native e-mail application (Outlook) of the end user, Rick Castell, as the second reply e-mail is being composed at step 312. Rick's Outlook application "hides" the local-part of the TO e-mail address unless the "E-mail Properties" of the TO address are examined in an additional window.

Figure 13:
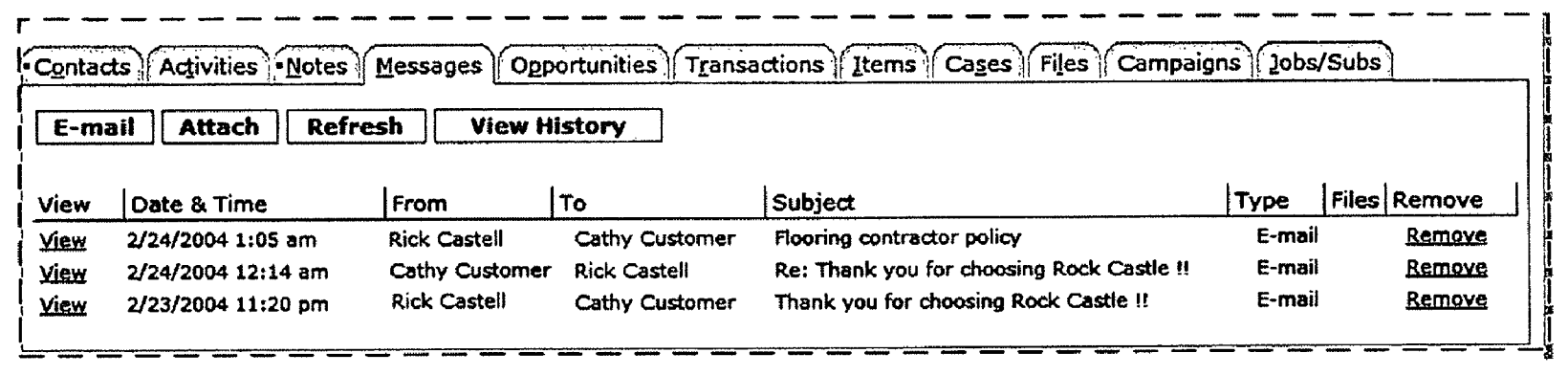
Figure 14:
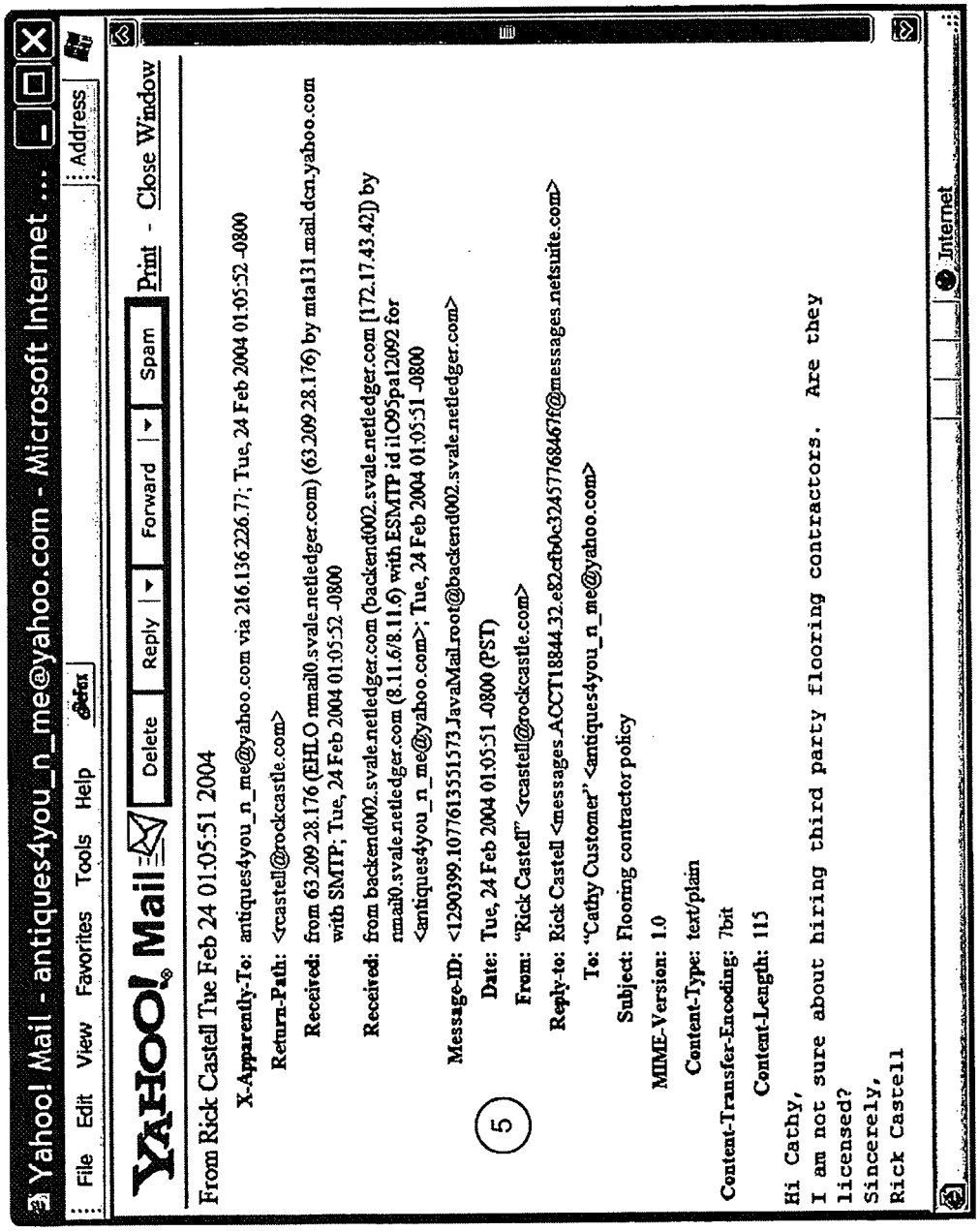
FIGS. 14-15 illustrate screens of a native e-mail system of an external contact.
Figure 15:
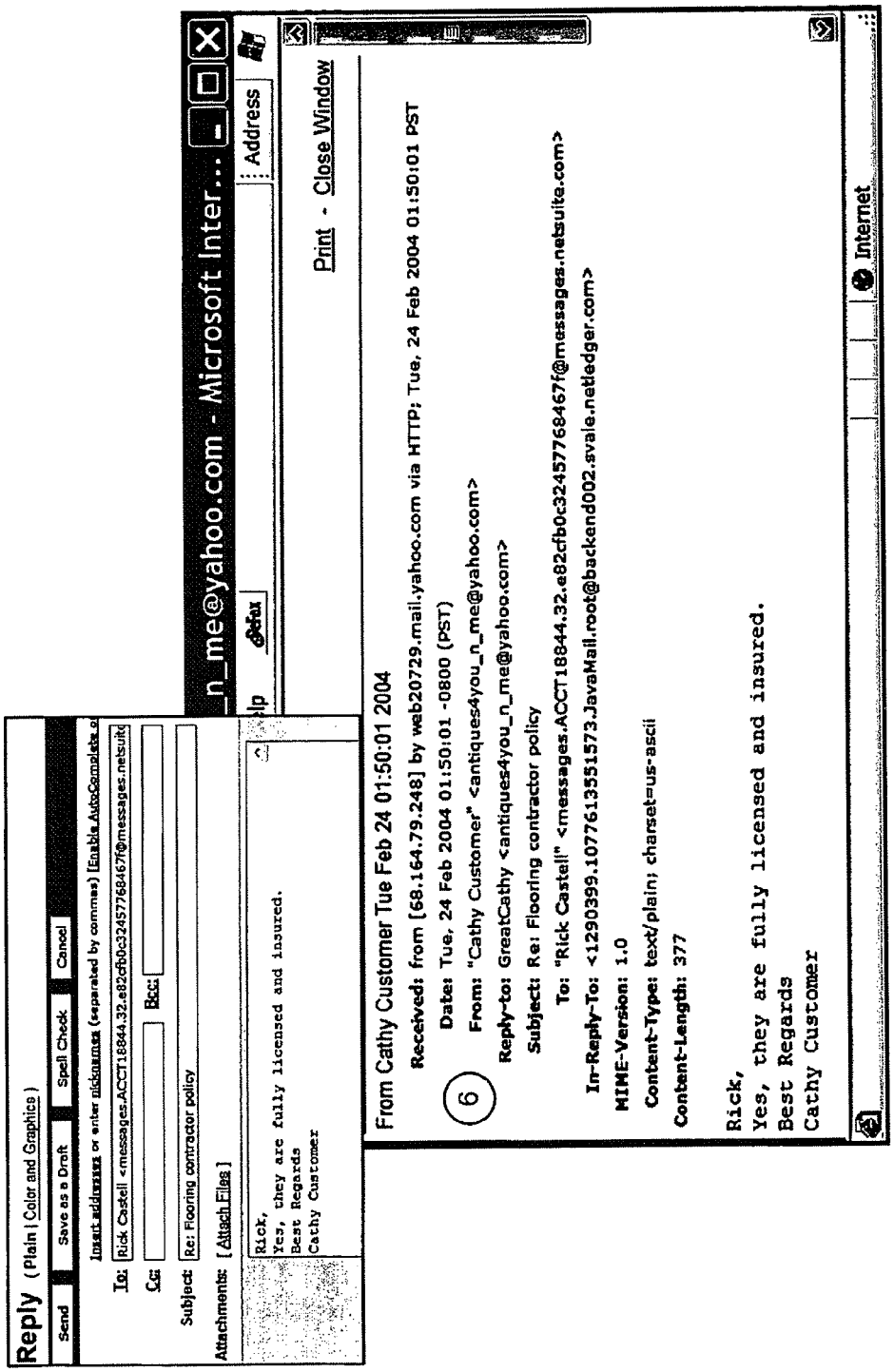

FIG. 13 illustrates the Messages tab of the Customer display 402 subsequent to (or contemporaneously with) step 314, showing that the second reply e-mail has been processed. FIG. 14 illustrates the message header and message body of the forwarded version of the second reply e-mail received at step 316. FIG. 15 illustrates Cathy Customer's native e-mail user screen as a third e-mail reply is composed at step 318, as well as its message header and message body. FIG. 16 illustrates the message header and message body of a forwarded version of the third reply e-mail received at step 322.

Figure 17:
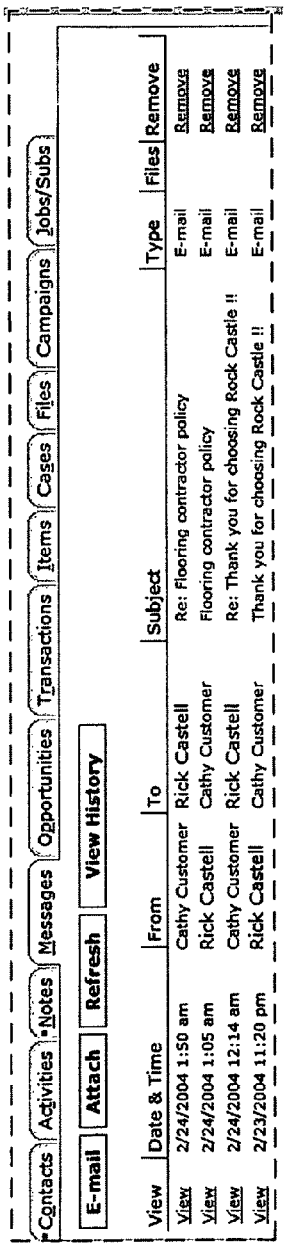
FIG. 17 illustrates a messages tab of the Customer screen of FIG. 4 comprising a log of an e-mail thread between an end user and an external contact tracked according to a preferred embodiment.
Figure 18:
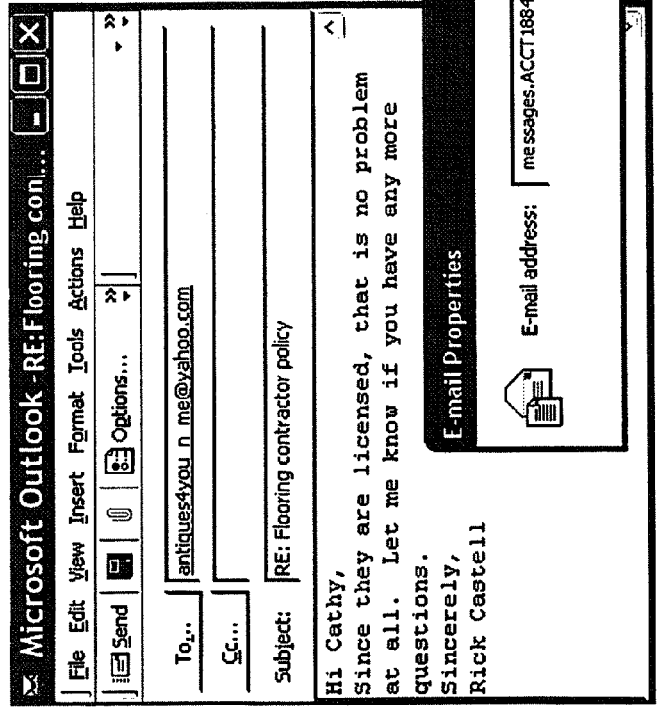
FIG. 18 illustrates screens of an end user's native e-mail system.
Figure 20:
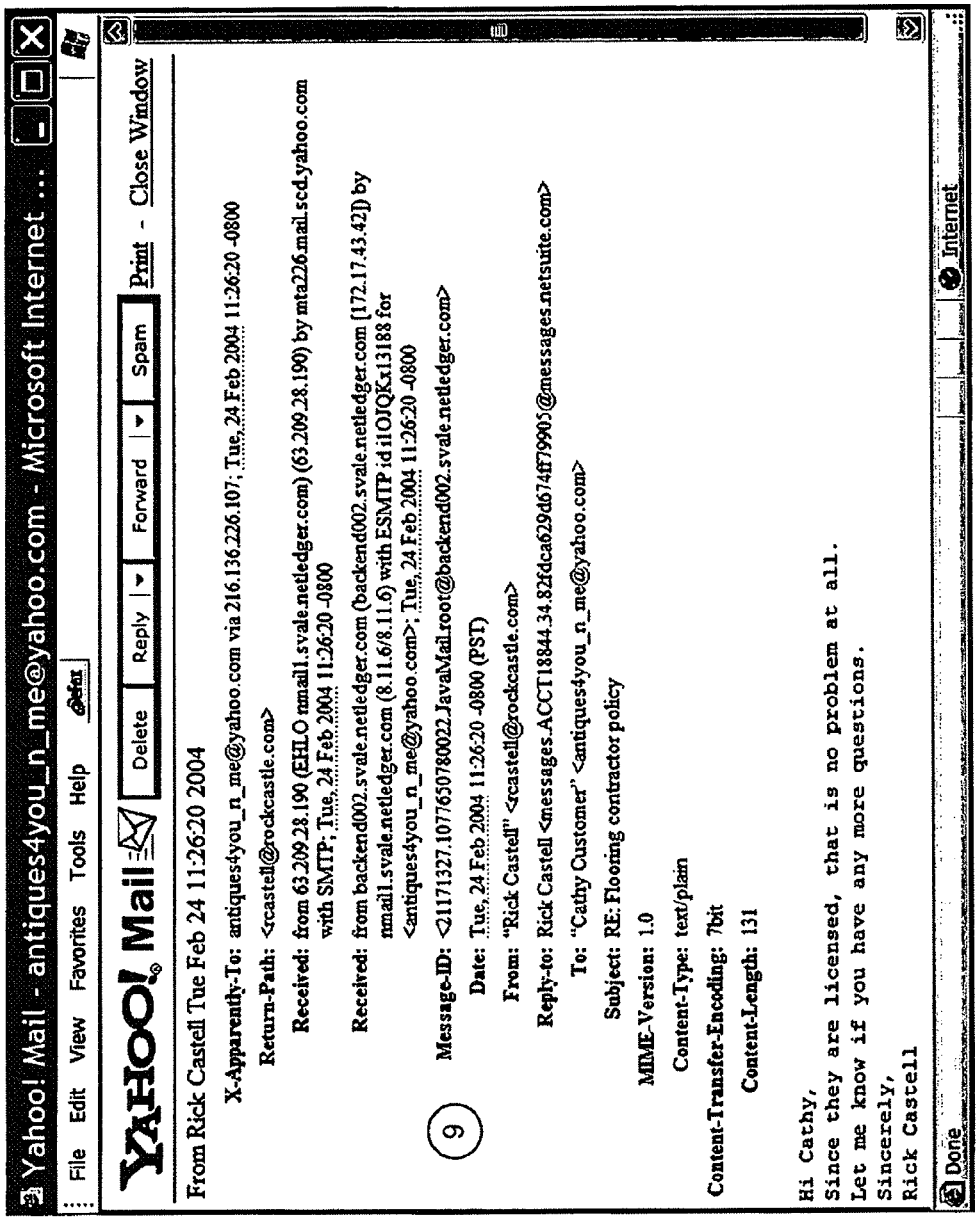
FIG. 20 illustrates a screen of a native e-mail system of an external contact.

FIG. 17 illustrates the Messages tab of the Customer display 402 subsequent to (or contemporaneously with) step 320, showing that the third reply e-mail has been processed. FIG. 18 illustrates the user interface of the native e-mail application (Outlook) of the end user, Rick Castell, as the fourth reply e-mail is being composed at step 324. FIG. 19 illustrates the Messages tab of the Customer display 402 subsequent to (or contemporaneously with) step 326, showing that the fourth reply e-mail has been processed. Finally, FIG. 20 illustrates the message header and message body of a forwarded version of the fourth reply e-mail sent at step 326.

In an alternative preferred embodiment, the FROM field can be used instead of the REPLY-TO field, and the REPLY-TO field can be left blank. RFC 2822 specifies that in the absence of the REPLY-TO field, replies should by default be sent to the mailbox(es) specified in the FROM field unless otherwise specified by the person composing the reply. In most common e-mail systems today, it has indeed been found that replies are addressed to the address specified in the FROM field in the absence of a REPLY-TO address. Thus, according the an alternative preferred embodiment, a local part of a FROM field of an initial e-mail message sent from the internal e-mail facility to the external contact includes a tracking string encoding tracking information associated with the end user and the external contact with respect to the web-based business information system. A domain of the FROM field of the initial e-mail message corresponds to a domain of the internal mail facility. The external contact presses "reply" in their e-mail application and sends a first reply e-mail message having a TO field that includes the tracking string. Upon receipt of the first reply e-mail message, the web-based business information system sends a modified version thereof to the native e-mail address of the end user, the modified version having a FROM field with a domain corresponding to the domain of the internal e-mail facility and a local part including a first modified version of the tracking string. The end user presses "reply" in the native e-mail application and sends a second reply e-mail message having a TO field that includes the first modified version of the tracking string. Upon receipt of the second reply e-mail message, the web-based business information system sends a modified version thereof to the native e-mail address of the external contact, the modified version having a FROM field with a domain corresponding to the domain of the internal e-mail facility and a local part including a second modified version of the tracking string, and the process can be repeated. In another alternative preferred embodiment, the web-based information system can use the FROM field to encode the tracking string when sending messages to the external contact, and can use the REPLY-TO field to encode the tracking string when sending messages to the end user, or vice versa.

Other functionalities can be provided in conjunction with the automated e-mail forwarding, tracking, and archiving. For example, in addition to logging and tracking the contents of "invitation" replies themselves, the web-based business information system can set calendar appointments associated with positive invitation replies, alter resource allocations for an event based on the number of positive invitation replies, and so on.

With the exception of needing to send the first message in an e-mail thread from within the internal e-mail utility (for those preferred embodiments in which the initial e-mail message is not automatically sent on behalf of the end user), the end user of the web-based business information system can enjoy the advantages of e-mail integration while also enjoying the use of their preferred native e-mail system, regardless of which particular e-mail system that is. Especially since no special software applications or plug-ins are required at the client desktop, the need to send that first message from within the internal e-mail utility (for those preferred embodiments in which the initial e-mail message is not automatically sent on behalf of the end user) is believed to be a superior value trade-off in view of the advantages of this integration.

Preferably, where the web-based business information system is provided by an ASP service, a company preference setting is provided allowing supervisory end users (e.g., supervisors) to select whether certain end users (e.g., sales reps) are enabled for the above-described native e-mail system integration features. For example, a field is provided to a "Set Up" support screen entitled "Enable Support Rep(s) to reply to cases via their native e-mail system."

By way of further description, other scenarios in accordance with to the preferred embodiments include the following. End user Tom, a sales rep, performs a mail merge from within the web-based business information system and sends a mass thank you e-mail to all customers he closed that month. One of the customers, George, had misplaced his receipt so he replied to the thank you e-mail he received from Tom by clicking reply in his native e-mail client, and requested a second receipt. When George sends the reply e-mail, the web-based business information system forwards a copy of the message to Tom's native e-mail address. A copy of the message is also archived by the web-based business information system and "attached" or otherwise associated to George's customer record.

End user John, a sales rep, e-mails an estimate he put together for a prospect he is working with, Maggie, from within the web-based business information system. When Maggie receives the e-mail, she decides she wants to add one more item the estimate. She clicks reply on the e-mail and sends John a message stating that she'd be interested in purchasing an additional item. That afternoon, when John logs into the web-based business information system, he sees a reminder showing that he has one new message. He clicks on the reminder and sees the new message is a response from Maggie. Upon viewing her message he updates the estimate and sends Maggie the updated version. Maggie is happy with it, and she decides to make the purchase.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, the forwarding, tracking, and archiving schemes described supra can be readily extended to scenarios in which there are a group of external contacts and/or a group of web-based business system users. By way of further example, the use of a "reply" command in an e-mail system can include the use of a "reply all" command.

By way of still further example, in alternative preferred embodiments, the local part of the REPLY-TO field (or FROM field, or other reply-designating header field) can be populated with only a portion of the overall e-mail tracking information needed, and the rest of the e-mail tracking information can be encoded into an additional thread-recurrent header or message field. By reply-designating header field, it is meant that most common e-mail systems will send replies to the address specified in that field when their "reply" functions are used. While REPLY-TO and FROM (when a REPLY-TO is not specified) are today the best header fields to use as the reply-designating header field, others may arise as RFC 2822 and/or related standards evolve, and are within the scope of the preferred embodiments.

By thread-recurrent field, it is meant that the information in that field is not changed, stripped away, or otherwise substantially disturbed by most common e-mail systems when their "reply" functions are used. By way of example, the SUBJECT header field is one suitable thread-recurrent field (other than REPLY-TO or FROM), because the SUBJECT text string is usually maintained (and appended with a "RE:") when the "reply" button is pressed. Other examples may include the COMMENTS or KEYWORDS fields specified in RFC 2822, depending on their treatment by most e-mail systems. Tags in the message body may also be used in specified situations and/or in the event of standards evolution that causes certain message body fields to be thread-recurrent.

In one example of the above alternative preferred embodiment, the reply-designating header field only contains enough information to direct the reply message back to the internal e-mail facility of the web-based business information system, and the rest of the e-mail tracking information can be specified in the additional thread-recurrent header field. By way of example, with respect to the example of FIG. 3A, the outgoing messages 1, 3, 5, 7, and 9 could just have a REPLY-TO field of "messages@netsuite.com", and the SUBJECT field could contain the other information specified in the tracking string, e.g. the string "ACCT18844.33.148e4cbffb39eddde676" shown for message number 7.

In still other alternative preferred embodiments, the local part of the REPLY-TO address (or FROM address) could be omitted altogether, and all of the tracking information can be encrypted into a different thread-recurrent field. For practical reasons, this scenario would likely be limited to situations in which the domain of the central communications server/internal mail system is used for no other purpose than the forwarding and tracking of the e-mail message threads. It is to be appreciated that the preferred embodiments described supra can be implemented with as-yet undefined fields that are thread-recurrent when future revisions of RFC 2822 are adopted.

By way of still further example, in another preferred embodiment, the initial e-mail message sent to the external contact at step 302 supra can be automatically sent by the web-based business information system on behalf of the end user, and thus the end user enjoys the native e-mail integration without even needing to send the initial e-mail from within the e-mail utility of the web-based business information system. This preferred embodiment is especially convenient in the context of helpdesk systems that automatically associate incoming cases with end users. Thus, reference to the details of the preferred embodiments are not intended to limit their scope, which is limited only by the scope of the claims set forth below.

What is claimed is:

1. One or more computer readable memories collectively having thereon computer executable instructions that when executed cause one or more computers to collectively, at least:

participate in a communication of a first e-mail message from a first e-mail user to a second e-mail user, the first e-mail message having a thread-recurrent field including a first field component identifying at least one of a plurality of messaging categories and a second field component identifying a messaging thread involving at least the first e-mail user and the second e-mail user;

participate in a communication of a second e-mail message from the second e-mail user to the first e-mail user, the second e-mail message having a thread-recurrent field corresponding to the thread-recurrent field of the first e-mail message, the thread-recurrent field of the second e-mail message including the first field component identifying the at least one of the plurality of messaging categories and the second field component identifying the messaging thread involving at least the first e-mail user and the second e-mail user; and evaluate one or more rules to access e-mail tracking functionality, the evaluation of the one or more rules based at least in part on the at least one of the plurality of messaging categories identified by the first field component of the second e-mail message and the messaging thread identified by the second field component of the second e-mail message.

2. One or more computer readable memories according to claim 1, wherein the at least one of the plurality of messaging categories includes general correspondence, and the e-mail tracking functionality comprises modifying the second e-mail message before the second e-mail message is received by the first e-mail user, the modified second e-mail message incorporating a modified version of a set of tracking information that includes the first field component identifying the at least one of the plurality of messaging categories and the second field component identifying the messaging thread involving at least the first e-mail user and the second e-mail user.

3. One or more computer readable memories according to claim 1, wherein the at least one of the plurality of messaging categories identified by the first field component of the second e-mail message includes trouble tickets, and the e-mail tracking functionality comprises helpdesk functionality.

4. One or more computer readable memories according to claim 1, wherein the at least one of the plurality of messaging categories identified by the first field component of the second e-mail message includes invitation replies, and the e-mail tracking functionality comprises business event organizing functionality.

5. One or more computer readable memories according to claim 4, wherein the business event organizing functionality comprises setting calendar appointments corresponding to positive invitation replies, and altering resource allocations for a business event based at least in part on a number of positive invitation replies.

6. One or more computer readable memories collectively having thereon computer executable instructions that when executed cause one or more computers to collectively, at least:

participate in a communication of a first message from a first user to a second user, the first message having a thread-recurrent field including a first field component identifying at least one of a plurality of messaging categories and a second field component identifying a messaging thread involving at least the first user and the second user;

participate in a communication of a second message from the second user to the first user, the second message having a thread-recurrent field corresponding to the thread-recurrent field of the first message, the thread-recurrent field of the second message including the first field component identifying the at least one of the plurality of messaging categories and the second field component identifying the messaging thread involving at least the first user and the second user; and evaluate one or more rules to access message tracking functionality, the evaluation of the one or more rules based at least in part on the at least one of the plurality of messaging categories identified by the first field component of the second message and the messaging thread identified by the second field component of the second message.

7. One or more computer readable memories according to claim 6, wherein the evaluation of the one or more rules is further based at least in part on a type or role of the first user.

8. One or more computer readable memories according to claim 6, wherein the first message comprises a first e-mail message and the second message comprises a second e-mail message sent in response to the first e-mail message.

9. One or more computer readable memories according to claim 6, wherein the thread-recurrent field of the first message further includes a cryptographic hash code based at least in part on the at least one of the plurality of messaging categories and the identification of the thread of communications involving at least the first user and the second user.

10. One or more computer readable memories according to claim 9, wherein the cryptographic hash code inhibits tampering with the first field component and the second field component.

11. One or more computer readable memories according to claim 6, wherein the at least one of the plurality of messaging categories includes general correspondence, and the message tracking functionality comprises modifying the second message before the second message is received by the first user, the modified second message incorporating a modified version of a set of tracking information that includes the first field component identifying the at least one of the plurality of messaging categories and the second field component identifying the messaging thread involving at least the first user and the second user.

12. One or more computer readable memories according to claim 6, wherein the at least one of the plurality of messaging categories identified by the first field component of the second message includes trouble tickets, and the message tracking functionality comprises helpdesk functionality.

13. One or more computer readable memories according to claim 6, wherein the at least one of the plurality of messaging categories identified by the first field component of the second message includes invitation replies, and the message tracking functionality comprises event organizing functionality.

14. One or more computer readable memories according to claim 13, wherein the event organizing functionality comprises setting calendar appointments corresponding to positive invitation replies, and altering resource allocations for an event based at least in part on a number of positive invitation replies.

15. One or more computer readable memories collectively having thereon computer executable instructions that when executed cause one or more computers to collectively, at least:

participate in a communication of a first e-mail message from a first e-mail user to a second e-mail user, the first e-mail message having a thread-recurrent field associated with an identification of a thread of communications involving at least the first e-mail user and the second e-mail user and a cryptographic hash code based at least in part on the identification of the thread of communications involving at least the first e-mail user and the second e-mail user;

participate in a communication of a second e-mail message from the second e-mail user to the first e-mail user, the second e-mail message having a thread-recurrent field corresponding to the thread-recurrent field of the first e-mail message, the thread-recurrent filed of the second e-mail message associated with the identification of the thread of communications involving at least the first e-mail user and the second e-mail user and the cryptographic hash code based at least in part on the identification of the thread of communications involving at least the first e-mail user and the second e-mail user; and evaluate one or more rules to access e-mail tracking functionality, the evaluation of the one or more rules based at least in part on the identification of the thread of communications involving at least the first e-mail user and the second e-mail user and the cryptographic hash code based at least in part on the identification of the thread of communications involving at least the first e-mail user and the second e-mail user.

16. One or more computer readable memories according to claim 15, wherein the e-mail tracking functionality comprises modifying the second e-mail message before the second e-mail message is received by the first e-mail user, the modified second e-mail message associated with a modified version of a set of tracking information that includes the identification of the thread of communications involving at least the first e-mail user and the second e-mail user and the cryptographic hash code based at least in part on the identification of the thread of communications involving at least the first e-mail user and the second e-mail user.

17. One or more computer readable memories according to claim 15, wherein the identification of the thread of communications involving at least the first e-mail user and the second e-mail user and the cryptographic hash code based at least in part on the identification of the thread of communications involving at least the first e-mail user and the second e-mail user are transparent to at least the second e-mail user.

18. One or more computer readable memories according to claim 15, wherein the thread-recurrent fields of the first and second messages are further associated with an identification of at least one of a plurality of communications categories, and the cryptographic hash code is further based at least in part on the identification of the at least one of the plurality of communications categories.

19. One or more computer readable memories according to claim 18, wherein the plurality of communications categories correspond to message tracking functionality categories.

20. One or more computer readable memories according to claim 18, wherein each thread-recurrent field comprises a string that includes, as distinct sub-strings, at least (i) the identification of the at least one of the plurality of communications categories and (ii) the identification of the thread of communications involving at least the first e-mail user and the second e-mail user.

* * * * *